United States Patent
Gorelik

(10) Patent No.: US 10,198,460 B2
(45) Date of Patent: Feb. 5, 2019

(54) SYSTEMS AND METHODS FOR MANAGEMENT OF DATA PLATFORMS

(71) Applicant: Waterline Data Science, Inc., Mountain View, CA (US)

(72) Inventor: Alexander Gorelik, Palo Alto, CA (US)

(73) Assignee: Waterline Data Science, Inc., Mountain View, CA (US)

( * ) Notice: Subject to any disclaimer, the term of this patent is extended or adjusted under 35 U.S.C. 154(b) by 493 days.

(21) Appl. No.: 14/296,205

(22) Filed: Jun. 4, 2014

(65) Prior Publication Data

US 2015/0356123 A1   Dec. 10, 2015

(51) Int. Cl.
*G06F 17/30* (2006.01)

(52) U.S. Cl.
CPC .. *G06F 17/30297* (2013.01); *G06F 17/30539* (2013.01)

(58) Field of Classification Search
CPC ......... G06F 17/30011; G06F 17/30292; G06F 17/30917
USPC .......................... 707/602, 603, 807; 715/765
See application file for complete search history.

(56) References Cited

U.S. PATENT DOCUMENTS

| | | | |
|---|---|---|---|
| 7,721,270 B2 * | 5/2010 | Ukelson | G06F 17/30569 717/136 |
| 7,873,992 B1 | 1/2011 | Daily et al. | |
| 8,234,312 B2 * | 7/2012 | Thomas | G06F 17/30569 707/803 |
| 9,613,068 B2 * | 4/2017 | Tsirogiannis | G06F 17/30292 |
| 2002/0184213 A1 * | 12/2002 | Lau | G06F 17/30569 |
| 2007/0028221 A1 * | 2/2007 | Ukelson | G06F 17/30569 717/136 |
| 2007/0055655 A1 * | 3/2007 | Bernstein | G06F 17/30292 |
| 2007/0083538 A1 | 4/2007 | Roy et al. | |
| 2007/0088704 A1 * | 4/2007 | Bourne | G06F 17/30569 |
| 2007/0168325 A1 * | 7/2007 | Bourne | G06F 17/30038 |
| 2007/0168374 A1 * | 7/2007 | Bourne | G06F 17/30038 |

(Continued)

OTHER PUBLICATIONS

International Search Report and Written Opinion for International Patent Application No. PCT/US2014/040895 dated Sep. 10, 2014, (6 pages).

(Continued)

*Primary Examiner* — Jean M Corrielus
(74) *Attorney, Agent, or Firm* — Goodwin Procter LLP

(57) ABSTRACT

In system for analyzing large data sets, document/file format can be discovered by attempting to parse the file using several parsers to generate a schema, assigning a score to each parsing, and selecting a parser based on the assigned scores. Schema element attributes, such as statistical parameters, can be derived and used in identifying schema elements associated with other files. Attributes of identified schema elements can be used to substitute missing data values with values based on such attributes. Data values corresponding schema elements can be selected and highlighted, and schema elements and/or attributes thereof can be highlighted based on selected data values. From a cluster of files, a lineage relationship between file pairs, indicating whether one file is derived from another, can be determined for several files. In reducing/compacting data, utilization of all available reducers can be optimized according to current utilization of one or more reducers.

22 Claims, 18 Drawing Sheets

(56) References Cited

U.S. PATENT DOCUMENTS

| | | | | |
|---|---|---|---|---|
| 2007/0260625 A1* | 11/2007 | Tien | ............ | G06Q 30/00 |
| 2008/0147605 A1* | 6/2008 | Bensalah | ............ | G06F 17/30917 |
| 2010/0250610 A1* | 9/2010 | Kanawa | ............ | G06F 17/30011 |
| | | | | 707/796 |
| 2014/0026033 A1* | 1/2014 | Subramaniam | ..... | G06F 17/2264 |
| | | | | 715/234 |
| 2014/0279834 A1* | 9/2014 | Tsirogiannis | ..... | G06F 17/30292 |
| | | | | 707/602 |
| 2014/0279838 A1* | 9/2014 | Tsirogiannis | ..... | G06F 17/30292 |
| | | | | 707/603 |
| 2017/0206256 A1* | 7/2017 | Tsirogiannis | ..... | G06F 17/30292 |

OTHER PUBLICATIONS

Lapi, E., et al., (2012) "Identification and Utilization fo Components for a Linked Open Data Plateform", Computer Software and Applications Conference Workshops (COMPSACW), IEEE., pp. 112-115.

* cited by examiner

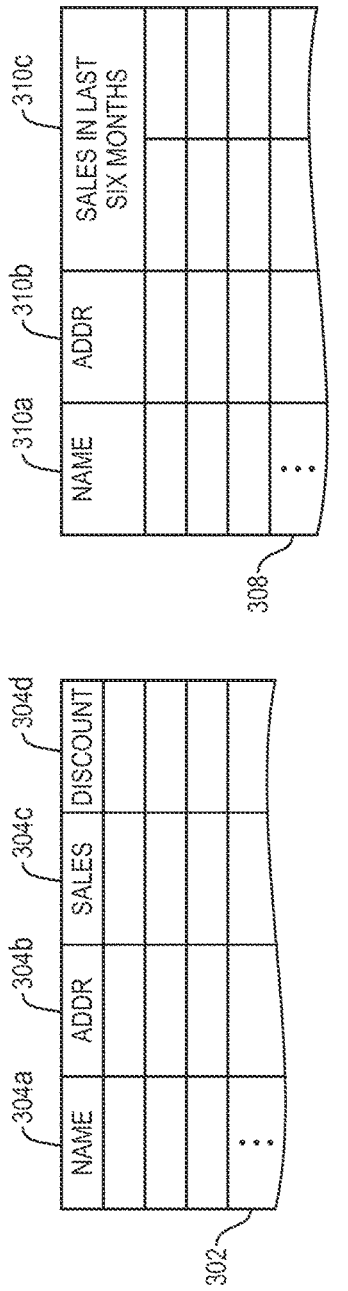
FIG. 3
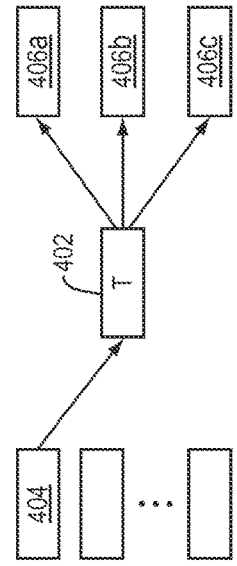
FIG. 4

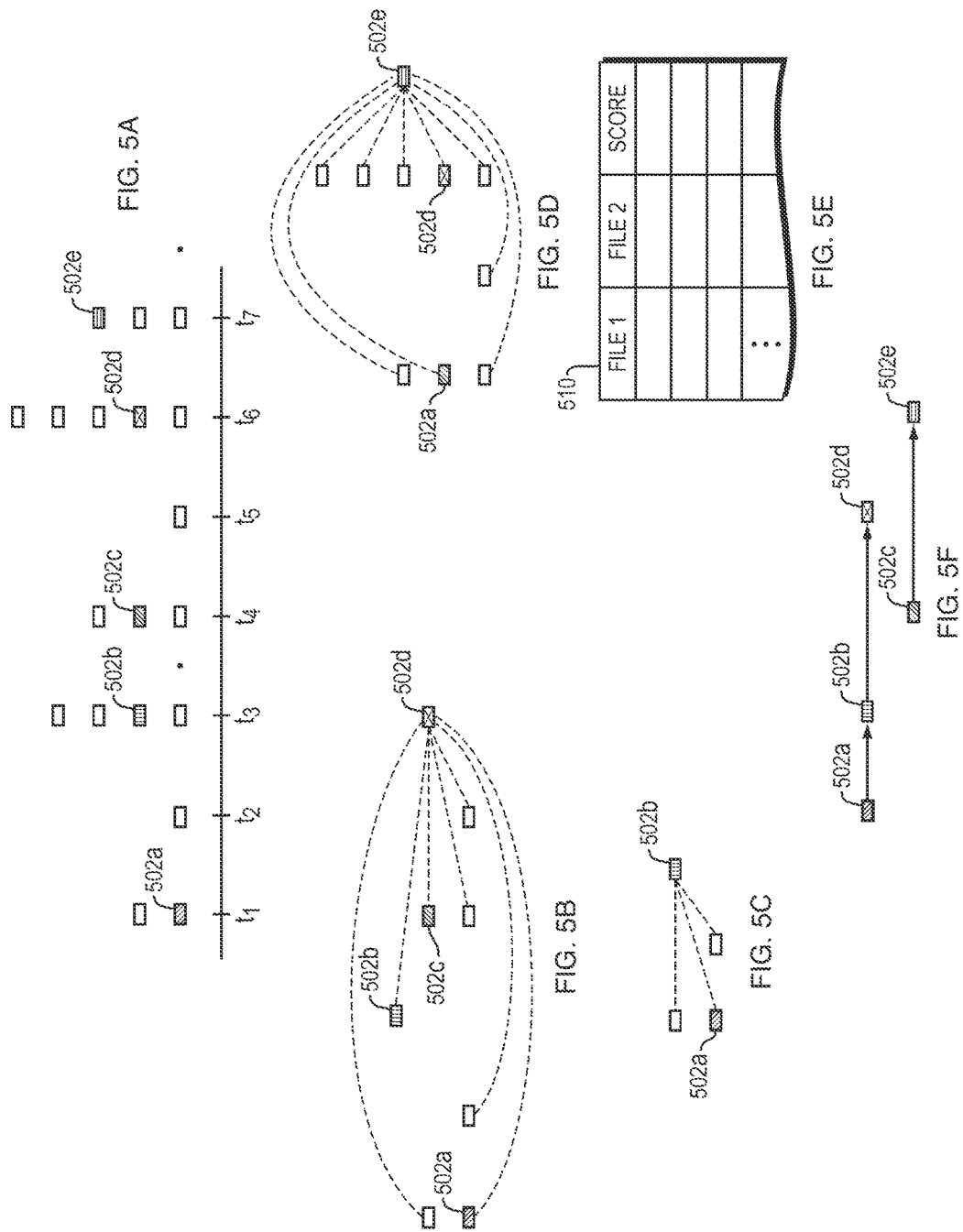

| | Type | Length | Classification | Max | Min | mode | median | uniqueness | null | non-null uniqueness | cardinality | Value Frequency | Pattern Frequency |
|---|---|---|---|---|---|---|---|---|---|---|---|---|---|
| ItemID | string | 10 | ID | 999982 | 100001 | | | 0.98 | 0 | 0.98 | 200000 | Click | Click |
| Name | | | | Zion | Adam | Matt | | 0.5 | 8 | | | | |
| Description | | | | | | | | | | | | | |
| UOM | | | | | | | | | | | | | |
| Currency | | | | | | | | | | | | | |
| Price | | | | | | | | | | | | | |
| Instock | | | | | | | | | | | | | |
| discount | | | | | | | | | | | | | |
| Channel | | | | | | | | | | | | | |

FIG. 11A

| | Common | | | Flat Value Stats and Metrics | | | | Set Value Stats and Metrics SS=Sub-Schema | | | | | |
|---|---|---|---|---|---|---|---|---|---|---|---|---|---|
| | Null | MSS | Depth | Uniqueness | Max | Min | Mode | Size:Max | Size:min | Size:Avg | SS:total leaves | SS:Depth | SS:string |
| ACCT_ID | 0% | 0% | 1 | 99% | 200300 | 0 | | | | | | | |
| Fname | 0% | 0% | 1 | 60% | Zion | Aan | David | | | | | | |
| Lname | 0% | 0% | 1 | 70% | Zen | Ahn | Smith | | | | | | |
| Address | 0% | 0% | 1 | | | | | | | | | | |
| Street | 0% | 0% | 1 | 20% | | | | | | | | | |
| City | 1% | 0% | 1 | 50% | | | | | | | | | |
| State | 0% | 0% | 1 | 10% | | | | | | | | | |
| ZIP | 10% | 10% | 1 | 30% | | | | | | | | | |
| Orders | 8% | 8% | 1 | | | | | 324 | 3 | 30 | 17 | 2 | 6 |
| OrderID | | | 2 | | | | | | | | | | |
| ShipToAddress | | | 2 | | | | | | | | | | |
| BillToAddress | | | 2 | | | | | | | | | | |
| CommentLog | | | 2 | | | | | | | | | | |
| Items | Items | | 2 | | | | | 543-300 | | 12 | 10 | 1 | |
| ItemID | | | 3 | | | | | | | | | | |
| Name | | | 3 | | | | | | | | | | |
| Description | | | 3 | | | | | | | | | | |
| UOM | | | 3 | | | | | | | | | | |
| Currency | | | 3 | | | | | | | | | | |
| Price | | | 3 | | | | | | | | | | |
| Quantity | | | 3 | | | | | | | | | | |
| ShipDate | | | 3 | | | | | | | | | | |

FIG. 11B

SYSTEMS AND METHODS FOR MANAGEMENT OF DATA PLATFORMS

FIELD OF THE INVENTION

The present disclosure generally relates to data storage and retrieval systems and, in particular to systems and methods for facilitating efficient analysis of vast amounts of data stored and accessed using such data storage systems.

BACKGROUND

Big Data is gaining a lot of traction in the enterprise world. Many companies have started their big data initiative, e.g., based on Hadoop. The promise of big data is that one can extract insights that could not be extracted before, because traditional platforms often do not allow for analysis of data at high speed, huge volume, and large variety (e.g., unstructured data). Examples of such useful insights include people's online behavior patterns, customer sentiment, segmentation, market trending, gap discovery, and so on.

One particular paradigm, that of the Data Lake or Data Hub, is emerging as a common framework of viewing a big data platform in an enterprise. A Data Lake is a logical place to store practically unlimited amounts of data of any format and schema, and is relatively inexpensive and massively scalable due to the use of commodity hardware. A Data Lake can be implemented using Hadoop, an example open source platform built on commodity hardware and map reduce as a powerful analytics framework, can significantly reduce the cost of storing and analyzing data. The core idea is generally to keep all the data including the data that has been traditionally thrown away in the Data Lake and leverage it at some future date/time for data science manipulations and analytics.

The Data Lake, however, may quickly face some challenges of its own, as the amount of data grows rapidly. Due to the experimental and iterative nature of data science and how a typical Data Lake, in general, processes data, many temporary files are created on the cluster. It is not uncommon to encounter clusters with millions of different files, some of which are transient, some are opaque, and some are simply temporary files generated by people or programs. Currently, most clusters are managed through naming conventions and good citizenship of its users. Very little of the storage and retrieval is managed in a systematic manner. As a result, instead of the intended Data Lakes the clusters often become data dumps.

While enterprises rush to Hadoop (or similar Data Lake paradigms, in general) for its promises as a data platform, it is relatively new and immature, even to the developer community, more so as an enterprise grade platform. For example, lack of management on the platform could turn an expensive Hadoop investment into a data dump therefore diminishing the return on investment (ROI).

An important premise of Big Data and the Data Lake is that data will be there and available to the users when it is needed. If there is no way to find the data or if the data is not usable, these impediments can defeat the purpose of having the Data Lake. If the users of the data lake always know exactly which files they need and understand the content of the files well, they can access the required data. In the context of typical enterprise data management, however, this assumption is not realistic, i.e., the users generally do not know which files they need and what a certain file or a set of files contains. It is not uncommon to see clusters of millions of files and, as such, without a systematic approach the problem of preventing a data lake from becoming a data dump is difficult if not impossible to address through conventional processes and manual intervention. Therefore, improved systems and methods are needed that bring the Data Lake platform to the next level as an enterprise grade data platform that delivers the value the industry may seek from it.

SUMMARY

Various embodiments of the present disclosure describe systems and methods that enable systematic organization of data on a data platform so that the users can reliably and efficiently access the data needed for their analysis without requiring substantial, if any, knowledge of the data organization. This is achieved, at least in part, by performing an automatic inventory of all files, and by capturing the lineage, format, and profile of each file in a metadata repository. A common problem with many data files is that a file may not include a header row (e.g., csv without field headings). In some instances, field names may exist, but they may be uninformative (e.g., col1, col2), ambiguous (e.g., a header "name" in cities table may imply something different from the same header "name" in customer table), or misleading (e.g., the "gender" field is sometimes overloaded for business customers to indicate whether they are a public or private corporation, LLC, etc.). In various implementations, the meaning of values in the fields of a file can be deduced by analyzing other files that have field names and/or have been tagged by a user with meaningful tags. Provenance, history, and lineage of files in the Data Lake, and changes in files over time, can be inferred by analyzing file properties such as timestamps and file contents. The inferred lineage information can be integrated with existing enterprise metadata repositories to provide complete lineage. The lineage information can be useful in determining the validity of changes in files, and to distinguish between temporary files and those to be used for data science analysis.

File purpose discovery, e.g., determining whether a file is transient (also called temporary), and not permanent, relies heavily on lineage discovery. File purpose discovery seeks to determine lineage: whether a "derived from" relationship exists between a pair of files. Lineage information is an important type of metadata, and it can facilitate determining the origin of a data to determine whether that data is fit for a specified purpose. Lineage information can also be used in impact analysis: if a model depends on a set of data, it can be important to understand upstream data sets the quality and/or authenticity of which can impact the validity of the model. Lineage information can also be used to ensure compliance requirements with external data contracting. For example, data received from a third party are often associated with strict legal constraints on how these data can be used. For example, some data vendors require that all data subsequently derived from the vendor data be removed if the customer stops paying for the originally received data sets. Analysis of the lineage of the data used for a specific purpose can be used to ensure that any data derived from the received third party data was not used for that purpose, in violation of the legal requirements. System origin and lineage are generally important in electronic discovery.

In a typical data platform, files are generated all of the time. Many operations, such as running a custom program, a script (e.g., a Pig script), or some Extract, Transfer and Load (ETL) program, derive files from other files. The lineage discovery process, in general, is a way of comparing among a set of files to derive a lineage diagram. At a high level, there are two steps to this discovery process. First, a set of file properties is discovered. The properties may include one or more of update and read timestamps, directory structure and naming conventions. Then the files are processed and the properties of the data inside the files are analyzed. File properties such as create, update and read timestamps can help narrow down the possibilities of two files being derived from one another. Directory structures and naming conventions can help identify the function of files. For example, directories designated as landing areas would only hold files loaded into the cluster and not created inside the cluster. Second, the files are compared, i.e., the properties and/or the contents of the files are compared to evaluate likely "computed from" or "derived from" relationships between pairs of files.

In order to be able to analyze the content of the files, file format need to be discovered and files need to be parsed. Automatic format discovery and format registry, format validation, and format change detection can be employed to determine the format of each file in the Data Lake and a parser suitable to parse that format. The detected format and the associated parser for each file can be recorded in the repository.

Accordingly, in one aspect a computer-implemented method is provided to facilitate lineage and/or purpose discovery. The method includes identifying a number of different candidate pairs among several files. Each candidate pair includes a respective first file of the several files and a respective second file of the several files, such that the second file was created after the first file was created. The method also includes calculating one or more respective first scores for each of the candidate pairs. Each respective first score is a measure of an extent to which the second file of the pair was derived from the first file of the pair. A second file of one of the one or more candidate pairs is selected such that none of the other files of the candidate pairs were derived from the selected second file, based on the respective first scores of the candidate pairs. The method also includes identifying one or more ancestors of the selected second file based on the respective first scores of the candidate pairs such that each ancestor was used to derive the selected second file or was used to derive another ancestor of the selected second file. Finally, the method includes generating a lineage for the selected second file such that the lineage includes the identified ancestors of the selected second file.

In some implementations, the second file of each of the candidate pairs was created or updated within a specified time period since the first file of the candidate pair was read. A second file of a particular candidate pair can be determined to have been derived from a first file of the particular candidate pair if one or more of the respective first scores each meets a respective threshold. Calculating one or more respective first scores for each of the candidate pairs can include calculating a schema measure for the candidate pair based on an overlap between a respective schema of the first file of the candidate pair and a respective schema of the second file of the candidate pair. Alternatively or in addition, calculating one or more respective first scores for each of the candidate pairs can include calculating a content measure for the candidate pair based on an overlap between respective content of the first file of the candidate pair and respective content of the second file of the candidate pair.

In some implementations, calculating the schema measure for a candidate pair includes calculating a respective first column signature for one or more columns in the first file of the candidate pair, and calculating a respective second column signature for one or more columns in the second file of the candidate pair. Calculating the schema measure further includes identifying one or more columns in the first file of the candidate pair that are similar to one or more columns in the second file of the candidate pair, based on a comparison of one or more first column signatures to one or more second column signatures. A schema measure can be calculated based on, at least, a number of the identified columns. A particular column signature for a column can include one or more of the following: a data type of the column, a distribution of values in the column, frequent values in the column, a frequency of values in the column, a frequency of lengths of values in the column, a frequency of patterns of values in the column, and output of one or more hash functions applied to values in the column.

Alternatively or in addition, calculating the schema measure for the candidate pair can include determining a number of schema elements in the first file of the candidate pair that are similar to schema elements in the second file of the candidate pair, and calculating the schema measure based on, at least, the number of schema elements that are determined to be similar. A particular schema element can be: hierarchical, a key, an element, a name, an attribute, or a column. In some implementations, calculating the content measure for the candidate pair includes determining a degree of overlap in values of one or more schema elements in the first file of the candidate pair with values of one or more similar schema elements of the second file of the candidate pair. The content measure can be calculated based on, at least, the degree of overlap.

The method can further include identifying a file in the lineage having one or more ancestors and one or more descendants. The identified file can be designated as temporary, e.g., if a number of descendants of the identified file does not meet a threshold, if the identified file has been used in a join operation with another file, if a plurality of the descendants of the identified file are in different respective directories, if a name of the identified file indicates that the identified file is temporary, or if the identified file is read or updated frequently. A file can be designated as temporary if any one or more of these conditions are met. The identified temporary file can be disposed based on a user specified policy. Disposing can include one or more of: removing the temporary file, archiving the temporary file, and compressing the temporary file after a specified period of time.

In some implementations, identifying a particular candidate pair among the various files includes identifying a pair of files of the several files that have respective names or file paths that partially overlap. One file of the pair of files can be designated as the first file of the particular candidate pair and the other file of the pair of files can be designated as the second file of the particular candidate pair. Additionally or in the alternative, identifying a particular candidate pair among the several files can include identifying a pair of files of the several files that have respective names that include timestamps, have respective names that include a substring and a respective number, have a substantially same number of rows, or if one of the files of the file pair is read frequently. If one or more of the conditions above can be met, one file of the pair of files can be designated as the first file of the particular candidate pair and the other file of the pair of files can be designated as the second file of the particular candidate pair.

In some implementations, calculating one or more respective first scores for a particular candidate pair includes determining that the first file of the particular candidate pair has been designated by a user as a descendent or that the second file of the particular candidate pair has been designated by the user as an ancestor. One or more of the respective first scores of the particular candidate pair can be set or reset to indicate that the second file of the particular candidate pair was not derived from the first file of the particular candidate pair.

In another aspect, a computer-implemented method for automatically generating data sets includes monitoring a number of files over time for changes to content of the files. Each file can have a respective schema and wherein the changes are to values of respective schema elements. The method also includes deriving one or more transformation rules based on the monitored changes. Each transformation rule can specify, for a respective schema element, a treatment of a respective value of the schema element. In addition, the method includes selecting a respective schema element for each of several model variables, and identifying, for each selected schema element, a respective file containing values of the selected schema element. For one or more values of the respective files, the value is transformed using the transformation rule for the respective schema element that matches the schema element of the value, and a first file is generated from the identified files wherein the first file contains values for one or more of the selected schema elements.

In some implementations, transforming the value using a transformation rule for a respective schema element that matches the schema element of the value includes one or more of: replacing the value with a value having a coarser grain, replacing the value with a default value, or replacing the value with an anonymous equivalent value. Alternatively or in addition, transforming the value using a transformation rule for a respective schema element that matches the schema element of the value includes determining that the value is empty and, based thereon, deleting a row from the file that contains the value. In some implementations, transforming the value using a transformation rule for a respective schema element that matches the schema element of the value includes determining that the value is an outlier and, based thereon, deleting a row from a file that contains the value or replacing the value with a value that is not an outlier. In some implementations, transforming the value using a transformation rule for a respective schema element that matches the schema element of the value includes, additionally or in the alternative, determining that the value is empty and, based thereon, replacing the value with another value that is inferred from a value in the one or the respective files for a same or different schema element. The value can represent gender, ethnicity, and or geographic location.

Generating a first file from the identified files can include changing a respective name of one of the first schema elements to a different name. The different name can be a synonym of the respective name or a corresponding name. A particular schema element can be part of a hierarchy of schema elements, a key, an element, a name, an attribute, or a column. Generating a first file from the identified files can include generating a new variable based on one or more variables, and selecting a respective schema element for the new variable.

In some implementations, identifying, for each selected schema element, the respective file containing values of the selected schema element includes identifying a file from several files having values for the largest number of selected schema elements. A number of the identified files cane joined through one or more common keys. The common keys can be identified using tags from a metadata registry. In some implementations, one or more respective dimension grains of several of the identified files match. Generating the first file from the identified files can include aggregating respective grains of one or more dimensions in the identified files to a finer grain. Alternatively or in addition, generating the first file from the identified files can include applying a filter to content in one or more of the identified files so that only rows that match the filter are retained in the first file.

In another aspect, a computer-implemented method is provided to facilitate discover of format, such as document or file format. The method includes identifying a number of parsers such that each of the parsers is configured to parse a respective file format and generate a respective schema. A particular schema can be JavaScript Object Notation, eXternal Markup Language, comma separated values, a tabular schema, or name value pairs. The method additionally includes identifying, for each of several parsers, one or more respective delimiters that have a high occurrence in files parsed by the parser, such that the high occurrence is an occurrence that exceeds a threshold. The method further includes analyzing a first file having an unknown format to determine a distribution of the respective delimiters, and determining a respective score for each of the parsers. The score can represent a likelihood that the parser will successfully parse the first file given the distribution and identified delimiters of the parser. The method also includes ordering the parsers according to the respective scores, and applying each parser to the first file according to the order until the first file is successfully parsed.

A particular parser is determined to have successfully parsed a particular file if one or more of the following occur: the particular parser generates a correct schema for the particular file and the particular parser generates schema element values that conform to a correct schema for the particular file. Additionally or in the alternative, a particular parser is determined to have successfully parsed a particular file if a number of parsing error corrections generated by the particular parser does not exceed a second threshold.

In some implementations, the method further includes creating an association of the format of the first file with the parser that successfully parsed the first file. Additionally, the method can include determining that a format of a second file matches the format of the association, and using the parser of the association to parse the second file. A particular delimiter can be a non-alphanumeric character. Determining a respective score for each of the parsers can include determining a respective success rate for the parser. The success rate can be based on a number of files in a collection of files that the parser has successfully parsed. The score can be based on the success rate.

Determining a respective score for each of the parsers can also include obtaining a user-specified regular expression for the parser, and determining the score further based on whether a string matching the regular expression occurs in the first file. In some implementations, determining a respective score for each of the parsers includes identifying a string having a number of characters such that the string occurs in a same relative position in files parsed by the parser, and where a number of the occurrences of the string exceeds a second threshold. Determining the score can be further based on the number of occurrences of the string in the relative position in the first file.

In some implementations, determining a respective score for each of the parsers includes identifying a number of the files parsed by the parser, each file having a respective positional format, and such that a number of the identified files exceeds a second threshold. Determining the score can be based on a number of positional format features of the first file. A particular positional format feature can be, for several rows in a file, one or more of: an occurrence of a particular data type at a particular column, an occurrence of a space separator at a particular column, or an occurrence of a constant value at a particular column.

In another aspect, a computer-implemented method for mapping reducers so as to improve utilization thereof includes performing a map operation in each one of several mappers on respective input data to generate a number of respective tuples. Each tuple includes a respective key and one or more respective data values. The method includes selecting a one or more of the keys from the several keys. For each key $K_i$ of the selected one or more keys, if $$KC_i > \frac{T}{R},$$

all tuples having $K_i$ as a key are assigned to one of several reducers having no assigned tuples. $KC_i$ is a count of occurrences of $K_i$ in the tuples, T is a count of the tuples, and R is a count of the reducers. Otherwise, if $$KC_i < \frac{T}{R},$$

all tuples having $K_i$ as a key are assigned to reducer $R_j$ of the several reducers, such that $$CR_j + KC_i < \frac{T}{R} \text{ and } \frac{T}{R} - (CR_j + KC_i) < M,$$

where $CR_j$ is a count of tuples assigned to $R_j$ and M is a first threshold. If the above condition is not satisfied, all tuples having $K_i$ as a key are assigned to a reducer $R_k$ having a fewest number of assigned tuples. The method also includes performing a reduce operation in each reducer on the tuples assigned to that reducer, to generate output data.

Obtaining or generating several tuples can include ordering the keys according to $KC_i$ from highest $KC_i$ to lowest. Selecting one or more keys can include selecting keys such that, for each selected key $K_i$, $KC_i \geq N$, wherein N is a second threshold. In some implementations, $$N = \left(\frac{T}{R}\right) \times c,$$

where c is a constant. The threshold M can be specified as $$M = \left(\frac{T}{R}\right) \times c,$$

where c is a constant.

In some implementations, the includes, for each unselected key $K_i$, assigning tuples having $K_i$ as a key to reducer $R_p$, where p is a function of $K_i$. The function p can be a hash function. The mappers can operate simultaneously so as to perform the map operation in parallel. The reducers can also operate simultaneously so as to perform the reduce operation in parallel. In some implementations, the method includes setting $$R = \left\lceil \frac{T}{KC_x} \right\rceil,$$

where x is the reducer having the most tuples assigned thereto.

In another aspect, a computer-implemented method for meta-data or glossary registry includes determining, for each of several files and one or more respective schema elements in the file, a respective signature for the schema element. The signature is a characterization of a number of values of the schema element in the file. The method includes, for each of a number of glossary terms, associating the glossary term with the signatures of one or more of the schema elements that each has a respective schema element label that matches the glossary term. The method further includes identifying a first schema element of one of the several files that does not have a respective schema element label. The method finally includes selecting a glossary term associated with a signature that matches a signature of a first schema element, as a suggested schema element label for the first schema element.

Associating the glossary term with the signatures of one or more of the schema elements that each has a respective schema element label that matches the glossary term can include calculating an edit distance between the label and the glossary term. Whether the label matches the glossary term can be determined based on the edit distance not exceeding a threshold. Additionally or in the alternative, associating the glossary term with the signatures of one or more of the schema elements that each has a respective schema element label that matches the glossary term can include determining that the label matches the glossary term if the label is a synonym of the glossary term. The method can include receiving user input associating the synonym with the glossary term.

In some implementations, selecting a glossary term associated with a signature that matches a signature of a first schema element as a suggested schema element label for the first schema element includes determining that the signature matches the signature of the first schema element based on one or more of: respective types of the first schema element data values, frequency of the types, range of the data values, distribution of the data values, format of the data values, length of the data values, overlap in the data values, and overlap in most common data values. Alternatively or in addition, selecting a glossary term associated with a signature that matches a signature of a first schema element as a suggested schema element label for the first schema element can include identifying a number of glossary terms that are associated with respective signatures that match the signature of the first schema element. One of the several glossary terms can be selected based on one or more specified criteria. A specified criterion can be a count of times that the glossary term is used as a schema element label in the several files.

In some implementations, the method includes providing the selected glossary term as a suggested label for the first schema element, and receiving user input accepting or rejecting the suggested label. Each of the several glossary terms can occur as a schema element label in a respective collection of different files associated with a respective group of different users, such that a count of the group of users exceeds a specified threshold.

In some implementations, a particular schema element can be any of an eXtensible Markup Language (XML)

fragment, a JavaScript Object Notation (JSON) structure, a Graph DB graph, a portion of a relational, columnar, in-memory or non-relational database, an object store schema element, or a log file. A particular schema element can be hierarchical, or can be a key, name, an attribute, or a column.

In some implementations, the particular schema element is a column field. The signature of the particular schema element can include one or more of the following: a data type of a particular schema element, a minimum value and a maximum value of the values of the particular schema element, a distribution of values of the particular schema element, frequent values of the particular schema element, a frequency of values of the particular schema element, a frequency of lengths of values of the particular schema element, a frequency of patterns of values of the particular schema element, output of one or more hash functions applied to values of the particular schema element, and a regular expression for the values of the particular schema element. The particular schema element can be an XML fragment or a JSON structure, and the signature of the particular schema element can include one or more of the following: elements, attributes, Uniform Reference Locators, XPATH, dependencies between element values and presence of other elements, average element depth, minimum element depth, maximum element depth, element frequency, bad elements, constant elements, implied nulls, profile of element values, and references to other files.

The particular schema element can be a GraphDB graph, and the signature of the particular schema element can include one or more of the following: average graph depth, disconnected nodes in the graph, most connected nodes in the graph, a count of islands in the graph, sizes of islands in the graph, sizes of the biggest and smallest islands in the graph, an average size of an island in the graph, and counts of nodes having different respective numbers of connections.

The particular schema element can be a portion of a name-value or big table database, and the signature of the particular schema element can be based on one or more of the following attributes the schema element data values: cardinality, nulls, functional dependencies between column values and between presence of various columns, least frequent columns, empty columns, constant columns, column groups, minimum, average and maximum number of columns having values, number of columns, and key columns for each column group. The particular schema element can be a name-value or big table database column that includes comma separated values, a JSON object, or an XML document. Finally, the particular schema element can be a log file, and the signature of the particular schema element can include one or more of the following: tags, most frequent messages, minimum, average and maximum time between messages, and common fields.

In another aspect, a computer-implement method for contextual meta-data navigation includes providing a graphical user interface having an interactive metadata display and an interactive data display. The method includes selecting a file having a respective schema that includes a number of schema elements such that the file contains several values for the schema elements. Moreover, the method includes presenting on the data display a number of the values in the file, and presenting on the metadata display, for one or more of the schema elements, respective meta-data. The displayed metadata can include a number of attributes that characterize values of the schema element. The method further includes receiving user selection of one or more of the attributes of a first schema element presented on the metadata display and, based thereon, highlighting the values in the file presented on the data display for the first schema element and that have the selected attributes of the first schema element. Alternatively or in addition, user selection of one or more of the values of a second schema element presented on the data display can be received and, based thereon, attributes of the second schema element, displayed on the metadata display, and that characterize the selected values, can be highlighted.

In some implementations, the method further includes presenting on the metadata display a number of schema names, each of which corresponds to a respective schema having one or more respective schema elements. The method also includes receiving user selection of one of the schema names in the metadata display and, based thereon, presenting on the data display information about one or more files that have the selected schema. The information can include one or more of: respective names and respective file directory locations of the files, and respective lineages of the files. The method can also include presenting on the metadata display one or more schema elements of the schema that corresponds to the selected schema name.

The metadata display and the interactive data display can be presented or provided on separate display devices. One of the display devices can be a display on a smart phone, a tablet computer, a laptop computer, smart glasses, or a smart watch. Highlighting the values of the file presented on the data display that have the selected attributes of the first schema element can include hiding the values of the file that do not have the selected attributes.

A particular schema element can be hierarchical, or can be a key, a name, an attribute, or a column. An attribute of a particular schema element can include one or more of: a label, a data type of a particular schema element, a minimum value and a maximum value of the values of the particular schema element, a distribution of values of the particular schema element, frequent values of the particular schema element, a frequency of values of the particular schema element, a frequency of lengths of values of the particular schema element, a frequency of patterns of values of the particular schema element, output of one or more hash functions applied to values of the particular schema element, or a regular expression for the values of the particular schema element.

In another aspect, a computer-implemented method for meta-data or glossary registry includes determining, for each of several files and for one or more respective schema elements in that file, a respective signature for the schema element. The signature can be a characterization of several values of the schema element in the file. The method also includes, for each of several glossary terms, associating the glossary term with the signatures of one or more of the schema elements that each has a respective schema element label that matches the glossary term. A particular schema element can be an eXtensible Markup Language (XML) fragment, a JavaScript Object Notation (JSON) structure, a Graph DB graph, a portion of a relational, columnar, in-memory or non-relational database, an object store schema element, or a log file. The method further includes identifying a first schema element of one of the several files that does not have a respective schema element label, and selecting a glossary term associated with a signature that matches a signature of a first schema element, as a suggested schema element label for the first schema element.

Associating the glossary term with the signatures of one or more of the schema elements that each has a respective schema element label that matches the glossary term can include calculating an edit distance between the label and the glossary term. Determining that the label matches the glossary term can be based on the edit distance not exceeding a threshold. Additionally or in the alternative, associating the glossary term with the signatures of one or more of the schema elements that each has a respective schema element label that matches the glossary term can include determining that the label matches the glossary term if the label is a synonym of the glossary term. The method can include receiving user input associating the synonym with the glossary term.

In some implementations, selecting a glossary term associated with a signature that matches a signature of a first schema element, as a suggested schema element label for the first schema element includes determining that the signature matches the signature of the first schema element based on one or more of: respective types of the first schema element data values, frequency of the types, range of the data values, distribution of the data values, format of the data values, length of the data values, overlap in the data values, and overlap in most common data values. alternatively or in addition, selecting a glossary term associated with a signature that matches a signature of a first schema element, as a suggested schema element label for the first schema element can include identifying a number of glossary terms that are associated with respective signatures that match the signature of the first schema element. One of the several glossary terms can be selected based on one or more specified criteria. The particular criterion can be a count of times that the glossary term is used as a schema element label in the plurality of files.

In some implementations, the method further includes providing the selected glossary term as a suggested label for the first schema element, and receiving user input accepting or rejecting the suggested label. Each of the several glossary terms can occur as a schema element label in a respective collection of different files associated with a respective group of different users, such that a count of the group of users exceeds a threshold. A particular schema element can be hierarchical, and/or can be a key, a name, an attribute, or a column.

In some implementations, a particular schema element is a column field, and the signature of the particular schema element includes one or more of the following: a data type of a particular schema element, a minimum value and a maximum value of the values of the particular schema element, a distribution of values of the particular schema element, frequent values of the particular schema element, a frequency of values of the particular schema element, a frequency of lengths of values of the particular schema element, a frequency of patterns of values of the particular schema element, output of one or more hash functions applied to values of the particular schema element, and a regular expression for the values of the particular schema element.

A particular schema element can be an XML fragment or a JSON structure, and the signature of the particular schema element can include one or more of the following: elements, attributes, Uniform Reference Locators, XPATH, dependencies between element values and presence of other elements, average element depth, minimum element depth, maximum element depth, element frequency, bad elements, constant elements, implied nulls, profile of element values, and references to other files. A particular schema element can also be a GraphDB graph, and the signature of the particular schema element can include one or more of the following: average graph depth, disconnected nodes in the graph, most connected nodes in the graph, a count of islands in the graph, sizes of islands in the graph, sizes of the biggest and smallest islands in the graph, an average size of an island in the graph, and counts of nodes having different respective numbers of connections.

In some implementations, a particular schema element is a portion of a name-value or big table database, and the signature of the particular schema element is based on one or more of the following attributes the schema element data values: cardinality, nulls, functional dependencies between column values and between presence of various columns, least frequent columns, empty columns, constant columns, column groups, minimum, average and maximum number of columns having values, number of columns, and key columns for each column group. A particular schema element can be a name-value or big table database column that includes comma separated values, a JSON object, or an XML document. A particular schema element can be a log file, and the signature of the particular schema element can include one or more of the following: tags, most frequent messages, minimum, average and maximum time between messages, and common fields.

Various implementations of each of these aspects include corresponding systems, apparatus, and/or computer programs.

BRIEF DESCRIPTION OF THE DRAWINGS

FIG. 3 illustrates an example computation of schema-based score.

FIG. 4 schematically depicts an example designation of an intermediate file in a lineage chain.

FIGS. 5A-5F schematically illustrate an exemplary discovery of lineage, according to an implementation.

FIGS. 11A and 11B depict examples of profiles of tabular data and non-tabular data, respectively, according to one implementation.

Like reference numbers and designations in the various drawings indicate like elements.

DETAILED DESCRIPTION

Lineage and Purpose Discovery

Figure 1A:
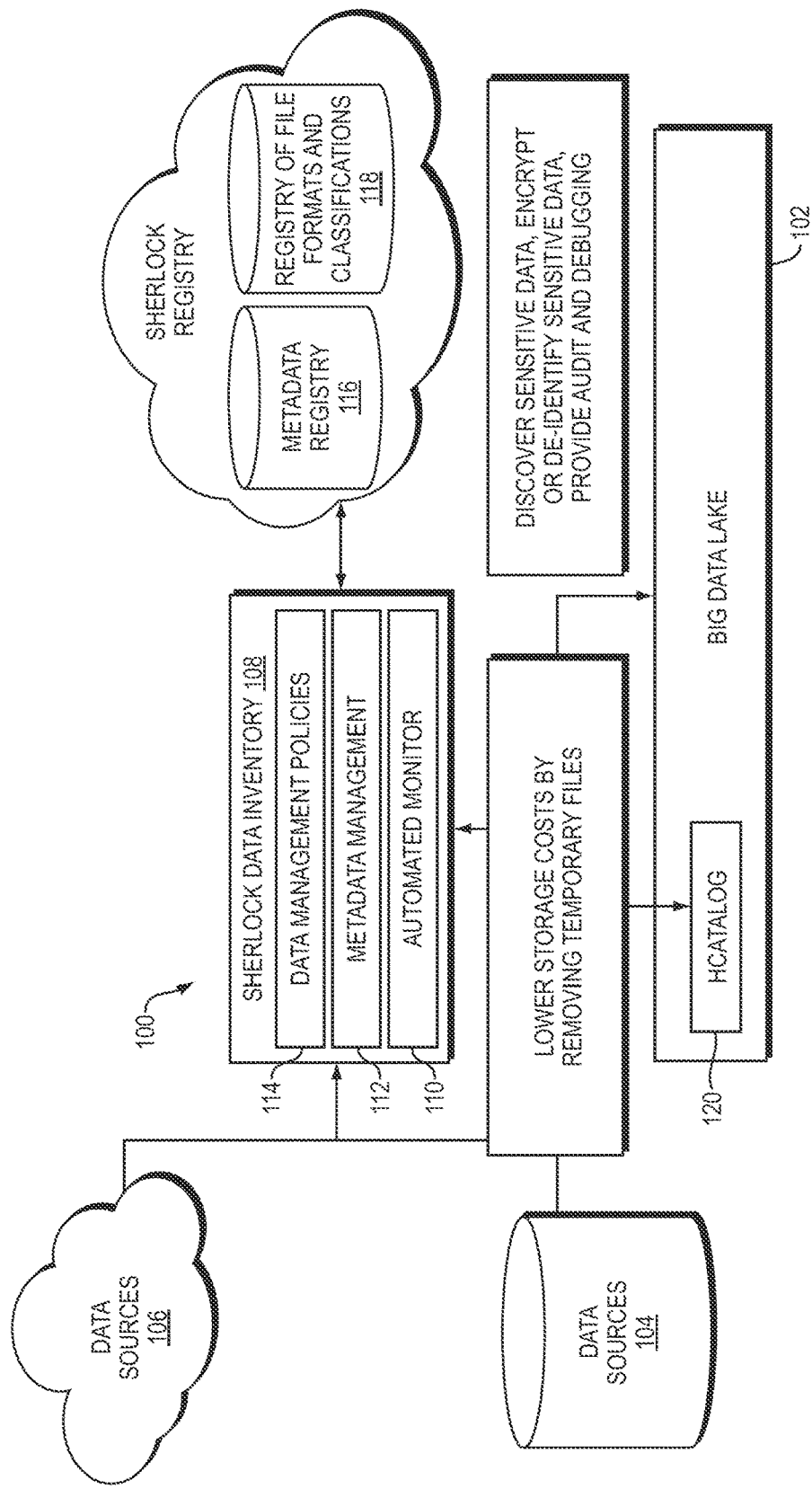
FIGS. 1A and 1B schematically depict various functional components of example systems of organization of data on a data platform.

With reference to FIG. 1A, an example data organization, analysis, and management system 100 includes a data lake 102. Various internal and/or closely associated data sources 104 and various remote and cloud based data sources 106 can supply data, e.g., files, streams, etc., to the system 100. An inventory module 108 can perform various inventory and management tasks. Specifically, a monitor 110 can monitor the cluster to detect new, deleted and changed files. A metadata management module 112 can process those new or changed files to analyze various file attributes such as date/time of creation and update, file size, file names, etc., and analyze data in those files to enable, for example, format detection, parsing, and profiling and to facilitate, e.g., lineage and purpose discovery. A policy module 114 can enforce various policies regarding access, privacy, data quality, etc. Various registries, one or more of which can include private and/or public registries may accumulate information that can be shared and used across users and across companies. This information may also be used in data analysis and/or data transformations. For example, metadata registry 116 can be used to expedite and standardize annotation of files and fields through the use of tags as well as automated field classification. The registry of parsers 118 can be used in format discovery and in efficient parsing of files. The tag definitions and field classifications that are derived by the system 100 as well as parsers for new, previously unknown file formats, can be stored in these registries, and can also be integrated with a data catalog 120 that is integral to the data lake 102.

Figure 1B:
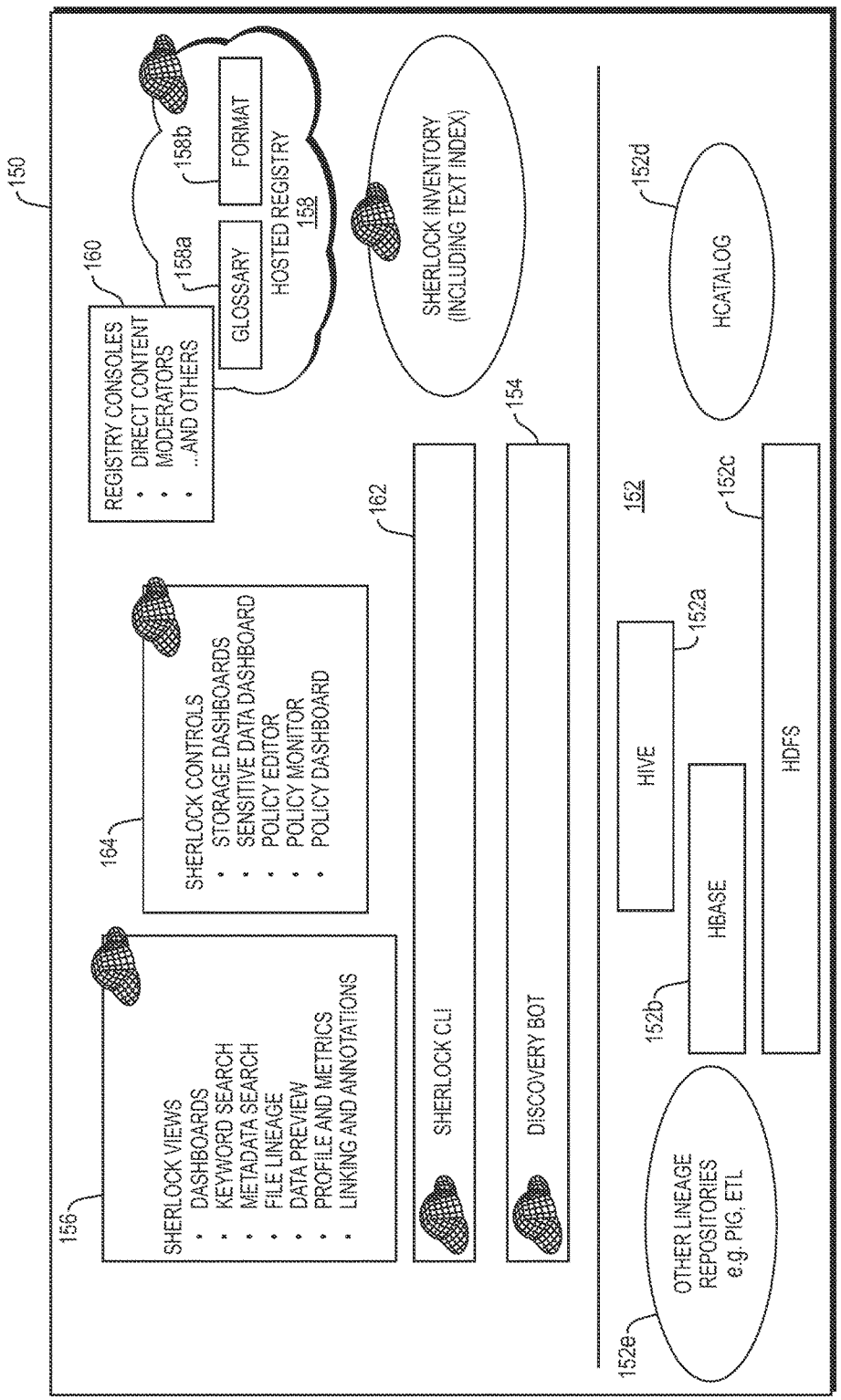

With reference to FIG. 1B, another example system 150 for organizing data includes various functions/components 152 provided by an underlying data platform. In some implementations, Hadoop is used as a data platform and, as such, the functions/components 152 include HIVE 152a, HBase 152b, Hadoop Distributed File System (HDFS) 152c, and HCatalog 152d. Other data platforms can be used including file systems, relational and non-relational database management systems, cloud storage systems like Amazon S3, and any other file storage and management systems. The functions/components 152 can also include external lineage repositories 152e, which can be supplemented and/or modified using lineage determined via lineage discovery. The data organization system 150 also includes a Discovery Bot 154 process that can scan and analyze files in a specified directory/folder, including those in any subdirectories/subfolders, and a command line interface 162.

Various modules 156, such as "File lineage" determination modules, Profile and metrics module, etc., can generate a desired view of the underlying data files. For example, the file lineage module can display lineage of files in a specified directory. The system 150 also includes a hosted registry 158 which includes a registry for metadata 158a, which can be used in schema discovery and format registry 158b, which can be used for format discovery. The glossary registry 158a and/or the parser registry 158b can include a registry that is private to a single user or a group of users and/or a public registry generally accessible by all users. The entry of items into the registry 158 and editing of those items can be controlled using a registry console 160 directly or through the Data Inventory GUI 162. Policies regarding removing and archiving data and protecting data privacy can be specified and compliance with such policies can be monitored using the controls module 164.

Figure 2A:
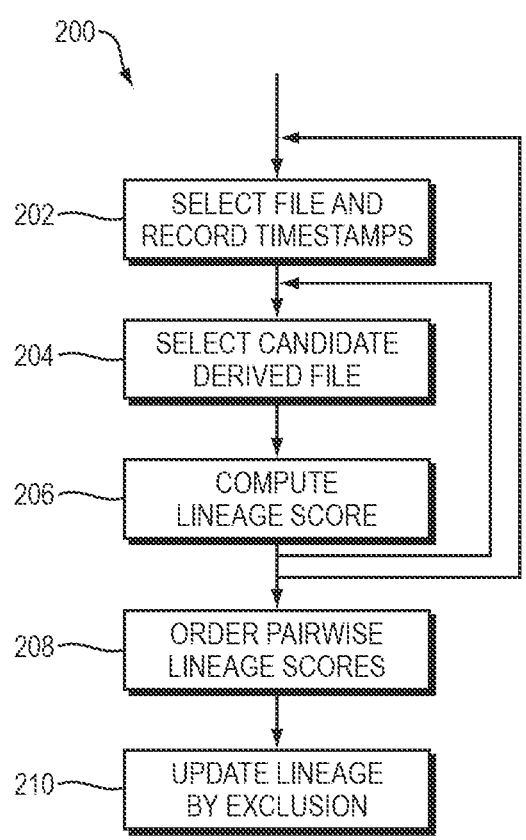
FIG. 2A depicts an example process for discovering lineage.

FIG. 2A depicts an example process 200 for discovering lineage. The operations described in FIG. 2A can be implemented by one or more data processing apparatus connected by one or more computer networks. The data processing apparatus can reside in the same or in different geographic locations. From a directory or folder to be scanned a file of which the lineage is to be determined is selected in step 202 (e.g., by the inventory module 108 of FIG. 1A) of the lineage-determination process 200. A timestamp associated with the file, e.g., the time of creation, is recorded as well. For the sake of convenience, in the following discussion of FIG. 2A, the file selected in step 202 is denoted File_A1. In general, any file created after the time of creation of File_A1 can have been based on or derived from File_A1, and files created before the time of creation of File_A1 are unlikely to have been derived from File_A1. As such, in one implementation, the files in the cluster to be scanned are sorted according to a timestamp (e.g., the time of creation), and the file having the earliest timestamp is selected as the File_A1 in step 202.

In step 204, a candidate derived file (denoted File_B1), i.e., a file having a timestamp later than the timestamp associated with File_A, is selected from the directory. In step 206, one or more tests (described below with reference to FIG. 2B) are performed on the pair of files File_A1 and File_B1 to compute a lineage score for the pair. The computed lineage score can indicate a likelihood that File_B1 was derived from or is based on File_A1, a higher lineage score typically indicating a greater likelihood. The steps 204 and 206 can be iterated several times, selecting a different candidate derived file, denoted File_Bk, in the k-th iteration and computing a lineage score for the candidate pair {File_A1, File_Bk} in the k-th iteration.

Thereafter, the step 202 can be repeated to select a file that is different than the previously selected file File_A1. In general, the file selected in the j-th iteration of the step 202 can be denoted File_Aj. As the files from one specified directory are typically selected for evaluation, it should be understood that the File_Aj may have been previously selected as a candidate derived file File_Bk in one of the prior iterations of the step 204. In the j-th iteration of the step 202, however, the file File_Aj is selected not as a candidate derived file and, instead, as a file of which the lineage is to be determined. The steps 204, 206 are then iterated with respect to the file File_Aj, i.e., in the k-th iteration a candidate file File_Bk that is potentially derived from the file File_Aj is selected in the step 204, a lineage score, denoted $S_{jk}$, indicating the likelihood that the file File_Bk was derived from the file File_Aj, is computed.

After all or a specified set of files in a certain cluster or file system or directory are selected and evaluated as described above, a comparison, e.g., ordering, of the pairwise lineage scores is performed in step 208. The comparison of scores can indicate direct and indirect lineage of various files in the directory. These comparisons can be based on one or more specified thresholds. To illustrate, an exemplary directory can include the files X1, Y1, Z1, X2, Y2, Z2, and X3. A comparison of lineage scores for each of 10 unique pairs can indicate that the files Y1 and Z1 derived from the file X1, and that the files Y2 and Z2 derived from the file X2. The scores can also indicate that both files Y1 and Z1 were derived directly from the file X1, the file Y2 was derived directly from the file X2, and that the file Z2 was derived directly from the file Y2 and, as such, indirectly from the file X2. X3 may be derived from a combination of X1 and X2. The corresponding lineage chains can be represented as {X1:Y1; X1:Z1; X2:Y2:Z2; X1, X2:X3}. It should be understood, that this example is illustrative only and that a typical cluster, file system or directory can include tens, hundreds, or even millions of files. Several lineage chains, each rooted in a file not likely derived from any other file can exist. Some lineage chains can include as few as two files, while other lineage chains can include several (e.g., 5, 8, 10, 160, 300, etc.) files.

The determination of direct and indirect lineage can additionally consider or weigh heavily file-content-based scores (computation of which is described below). In general, if there is an 80% overlap between the contents of the files A and B, a 75% overlap between the contents of files A and C, and only 50% overlap between the contents of the files B and C, in one implementation it is determined that both files B and C are children of (i.e., derived from) the file A, and that files B and C are not derived from each other. Similarly, according to one implementation, if file B is a child of file A, and file C can be a direct child for either file A or file C, if the file C has fields and/or rows from the file A that are not in the file B, the file C is determined to be derived directly from the file A and not from the file B. Conversely, if the file C includes content from the file B, that is not in file A, file C is determined to be derived directly from the file B and not from the file A, even though, the file B was determined to be a child of file A.

In optional step 210, lineage can be determined by exclusion. In general, very similar files that are not related (e.g., files created by periodic data collection) are beneficially not identified as derived from each other. For example, a deposit of stock quotes that is done every minute with 300 to 400 attributes, except for the timestamp, stock price, and volume, the data collected at each minute can be very similar. In this example, attributes or fields can be stock symbol, price, volume, company name, industry, 52 week max and min, etc. In some implementations, such similar but unrelated files are identified as not related by determining that some common attributes thereof contain different values. The common attributes that can be used for this purpose can be identified by name and/or attribute signature (e.g., field signature may include field type, length, data format (e.g., NNN-NN-NNNN for a social security number format where N is a number, A is a non-numeric character and non-alphanumeric characters are represented as themselves), min, max and average values and value distribution for numerical fields, a number of most common values and any other attributes that can determine that two fields contain the same data. Mismatch in these identified fields—especially fields containing temporal and geographical data can be used to rule out lineage between the two files.

In some implementations, the time conversion to a different time zone is analyzed. For example, if two files F1 and F2 are identical except for a common timestamp field TS such that if both files are sorted by TS, for every row in F1 and corresponding row in F2, the difference F1.TS−F2.TS is substantially the same. That difference can be the number of hours corresponding to two different time zones, if F1 and F2 are created and/or updated in different time zones. In this case, it can be assumed that F2 was derived from F1.

Figure 2B:
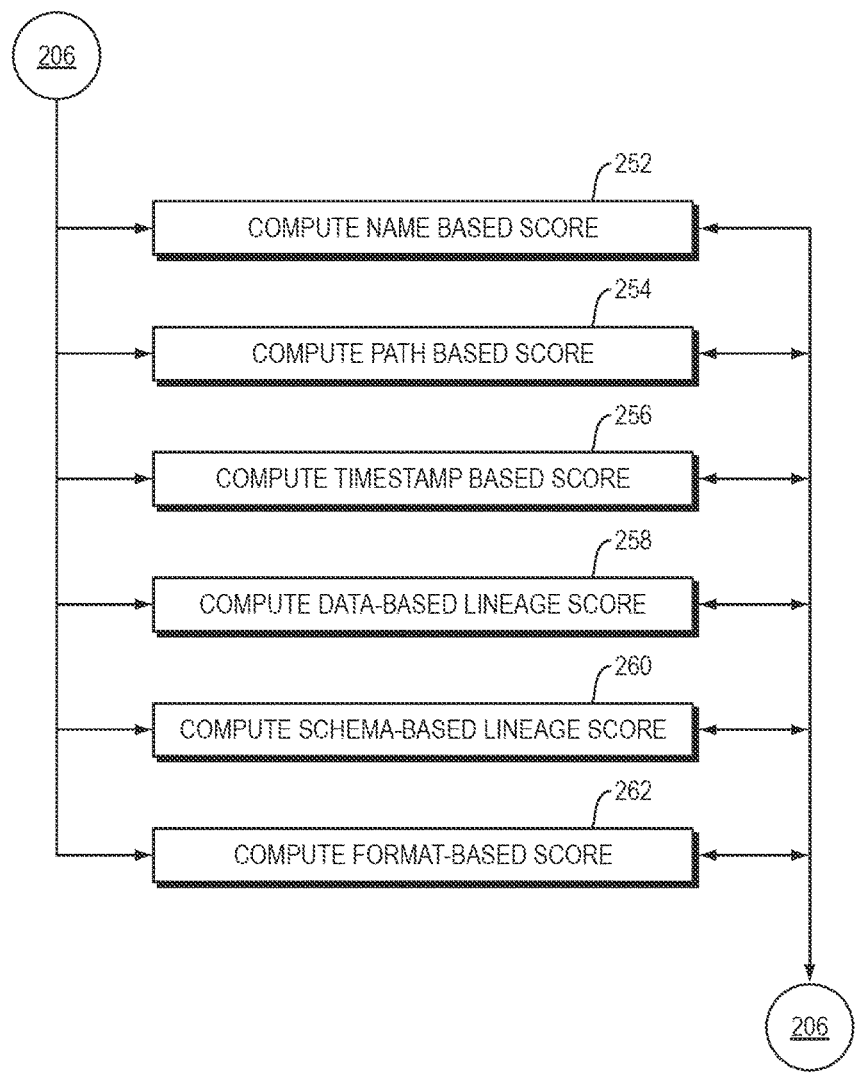
FIG. 2B depicts example computation of various scores used in discovering lineage.

FIG. 2B depicts example computation of various scores used in discovering lineage. The operations described in FIG. 2B can be implemented by one or more data processing apparatus connected by one or more computer networks. The data processing apparatus can reside in the same or in different geographic locations. A name based score is computed in step 252 (e.g., by the inventory module 108 of FIG. 1A). In general, the names of File_Aj and File_Bk are compared. If the two names include a common base name (e.g., "inventories," "orders," "sales," etc.), it is likely that File_Aj is related to File_Bk. In the step 252, the non-common portions of the filenames such as suffixes are also compared. For example, File_Aj can have a suffix v1 and File_Bk can have a suffix v4, suggesting that File_Bk is a version of File_Aj. Alternatively, File_Aj can have a suffix "XYZ D1220" and File_Bk can have a suffix "(XYZ D1220 (ABC D1222)," suggesting that someone with the initials XYZ modified File_Aj on December 20, and someone with initials ABC modified File_Aj on December 22 to create File_Bk. Increasing suffixes often indicate that a file having the same base name as another file but having a longer suffix than the other file was derived from the other file. In some instances, the filenames can indicate lineage or relationships to two or more files. For example, the names "SFDC_May_Orders.csv" and "ELOQUA_OPEN_EMAIL_COUNTS.csv" can imply provenance, and the name "Order_To_Email_Counts May.csv" can indicate that this file was derived from the first two. As such, based on a comparison of the base names and suffixes, a name based score is assigned to the candidate pair (File_Aj and File_Bk) in the step 252.

A path-based score is computed in step 254. In particular, the files in a specified directory can be stored in several sub-directories, and the files in different sub-directories can be related to each other or the files in a certain sub-directory can be derived from the files in another sub-directory. Therefore, if a portion or the entirety of the pathname of the file File_Aj matches a portion or the entirety of the pathname of File_Bk, the two files can be related to each other. For example, a directory SAP can be designated as a landing directory for files coming from SAP system, and directory Project_Poodle can be designated as a working directory for a specific project. It is then assumed that files in SAP directory are derived from SAP system and not from any files on this cluster, while files in Project_Poodle directory can be derived from files in SAP directory or from each other.

One or more timestamp based scores are computed in step 256. Specifically, if the files File_Aj and File_Bk have substantially the same base name, and if the timestamps of the two files follow a regular pattern of timestamps in files having that common base name, it is likely that the file File_Bk is not derived from the file File_Aj. Instead, the two files can represent two generally independent instances of a periodic collection of data of a certain type, such as weekly inventory data, daily sales data, etc. Therefore, a low timestamp based score can be designated to the candidate pair (File_Aj, File_Bk). If the timestamps of various files having a base name substantially common to that of the files File_Aj and File_Bk form an irregular pattern, however, it is likely that the different files are manually created versions of the same file. In that case, it is likely that the file File_Bk was derived from the file File_Aj and, hence, a high timestamp score can be designated to the candidate pair (File_Aj, File_Bk). The timestamps used in this analysis can include one or more of a time of creation, time of last update, etc.

Additionally or in the alternative, a timestamp based score can be computed in the step 256 by comparing the "last-read," "created," and "last updated" timestamps of the files. In general, if the file File_Bk is derived from the file File_Aj, the file File_Aj must have been read within some period (e.g., a few minutes, a few hours, etc.) from the time at which the file File_Bk is created and/or updated. In some implementations, the scan can be performed periodically (e.g., daily), thus, if LastScan is the timestamp the last time we started scanning the system, Ra is the "last read"

timestamp of the file File_Aj and Cb and Ub are the "created" and "updated" timestamps, respectively, of the file File_Bk, the file File_Bk can be considered to be derived from the file File_Aj if LastScan<Cb<Ra+Tmax_job. The threshold Tmax_job, i.e., the maximum duration of a job/process that can create the file File_Bk from the file File_Aj, can be preselected as, e.g., a few minutes, hours, etc. As Ra represents the last read timestamp and because the file File_Aj can be read after the file File_Bk is created, it is possible that the file File_Bk is derived from the file File_Aj even if Ra is greater than Cb. It is also possible, though not highly likely, that the file File_Bk was created without using any of the data of the file File_Aj, but was later updated using such data. Therefore, the file File_Bk can also be considered to be derived from the file File_Aj if LastScan<Ub<Ra+Tmax_job. If a cluster is scanned periodically (e.g., daily), the Cb may be older than the last scan, but Ub is not.

The contents/data of the file File_Aj can be compared with the contents/data of the file File_Bk in step 258, to compute a data-based lineage score. A substantial overlap between at least a portion of the data can indicate that the file File_Bk, having the later timestamp, can be derived from the file File_Aj having the earlier timestamp. In particular, if the files File_Aj and File_Bk contain substantially identical data but have different names, File_Bk can be a copy of File_Aj. Additionally or in the alternative, a significant overlap in at least a part of the contents of these two files can be classified into one or more of the patterns described below.

If the contents of the two files File_Aj and File_Bk are arranged in rows and fields, an observation that the two files have the same number of rows can suggest that the file File_Bk was derived from the file File_Aj. If File_Bk has the same number of rows but fewer fields, and if the fields common to both files have substantially identical values, File_Bk can be determined to be a subset (specifically, a subset of fields) of File_Aj. Similarly, if File_Bk has fewer rows but the same number of fields as File_Aj, the file File_Bk can be determined to be a subset (specifically, a subset of rows) of the file File_Aj. Often, such subsets result from the removal of outliers and missing values, filtering on a specified dimension (e.g., a smaller time period), etc.

The file File_Bk can be determined to include treated data based on the data in the file File_Aj if the two files have the same numbers of rows and fields, but some cells have different values. In particular, if a number of fields above some threshold (e.g., 80%) including dimension fields are identical, the different values in a few cells can indicate that missing values were filled in, type mismatches were set to NULL (for example, age field that mostly contains numbers, but has some strings like 'N/A', 'Unknown', etc.), and/or certain values are typically replaced with other values.

Dimension fields are one or more fields designated as dimension fields. In general, the fields that can be used to identify whether data in different files is overlapping or not can be designated as dimension fields. In some implementations, time and geographic fields are automatically recognized as dimensional and designated automatically as dimension fields by default. A user can change this designation and/or designate other fields (e.g., product id, office id, manufacturer, etc.), as dimensional fields. If dimension fields are different, then data can be determined to be different. For example, if one file has state=NY and the other file has state=CA, the data can be considered to be different. On the other hand, if balance is different, and if balance is not designated as a dimension field, the two files are determined to likely provide different versions of the same data.

Deduping is a common technique where duplicates are removed from a file. For example, there may be multiple entries for the same person in the address book and deduping operation will consolidate them into a single entry. Deduping can be detected if the two files have the same number of fields, one of the files has more rows, but the non-unique fields are now more unique (in the example above, the number of contacts is smaller, but the names are more unique—i.e., contain fewer duplicates). If the files File_Aj and File_Bk have about the same number of fields, File_Bk can include values that are aggregated along one or more dimensions.

The file File_Bk can be a join of the file File_Aj and another file or files, if File_Bk includes the fields from File_Aj and one or more other files, and the number of rows of File_Bk results from a join of one or more dimensions, e.g., inner, left outer, right outer, full outer, etc., of the file File_Aj and the other files. In general, in a join on dimensional fields the rows where the dimensional values are the same are concatenated. For example, if one file has a record with customerid 5, timestamp 1/1/12, and balance=1000, and the other file has a record with customerid 5, timestamp 1/1/12, and salesperson, 'Bob,' a join on customerid and timestamp can be performed to create a record that has both the balance and the salesperson, i.e., the record: customerid=5, timestamp 1/1/12, balance 1000, and salesperson, 'Bob.' Inner, outer, etc. joins can be used to perform a join where one file has a row with values that do not exist in the other file.

Finally, the file File_Bk can be a union of the file File_Aj and one or more other files, if File_Bk has the same schema (i.e., same fields) and the rows of File_Bk include the rows from File_Aj and the other files. For example, consider two files FA and FB, each one having two fields and two rows. Thus, FA has fields (C1, C2) with rows (values) (1, 1) and (2, 2), and FB has fields (X, Y) with values (1, 0) and (3, 4). A union of FA and FB can be a table with two fields and four rows: (1, 1); (2, 2); (1, 0); and (3, 4). In a union, in some implementations, the fields are assumed to match positionally, such that two or more files can be concatenated. A join of FA and FB can have one, two, three, or four fields, and none through four rows depending on the join condition. For example, if the join is performed on FA.C1=FB.X, and fields C1, C2 and Y are selected, the join would have one row with fields (C1, C2, Y), (1, 1, 0). In various implementations, if one or more of these patterns are observed for the candidate pair (File_Aj, File_Bk), a high data score can be assigned thereto in the step 258, indicating that File_Bk was likely derived from File_Aj.

In step 260 schema based analysis is performed to compute a schema-based lineage score/measure for the candidate pair (File_Aj, File_Bk). In general, if File_Aj and File_Bk have substantially the same schema they are likely related, i.e., File_Bk is either derived from File_Aj, or, in the alternative, the two files can represent independent data collections. If the two files contain fields with same signatures (or overlap of fields), File_Bk can have been derived from File_Aj and, as such, a high schema score can be assigned to the pair (File_Aj, File_Bk) in the step 260. A field signature can include one or more of field data type, field length, a pattern, statistical analysis of the values including min, max, average and, for numeric or temporal values, mean and standard deviation. The signature can also include some or all of the data values (may be a number of most common values or some representative compressed format that represents the values such as a bitmap or CRC or some other way to quickly telling if two files contain the same values). A field pattern is a format representation. For example, for a social security number (SSN), a pattern is NNN-NN-NNNN. A pattern or format can be a regular expression that describes what the data looks like. Also, if the two files are two independent data collections ("dumps"), they can still have substantially identical signatures as the data types and lengths can match. Substantially similar field signatures can imply field overlap. Generally, schema can describe rules that define a data element (e.g., cars can have make, model, color, and total mileage, and a car-rental record can have a car, rented flag, renters name, date of rental, and duration of rental. If it is determined that two files are not independent data collections, the fact that those two files have identical or substantially similar schema can indicate that one file was derived from the other. Substantially similar schemas, substantially similar field signatures, and/or significant value overlap generally imply a possibility that one file is derived from another.

By way of illustration and with reference to FIG. 3, a file 302 includes four fields: name 304a, addr 304b, sales 304c, and discount 304d. Signatures 306a-306d are computed for each of these fields. Another file 308 includes three fields: name 310a, addr 310b, and sales in last six months 310c. Signatures 312a-312c are computed for each of these fields of the file 308, as well. A schema score can be computed based on a comparison of the field signatures 306a-306d with the field signatures 312a-312c. If the file 302 includes sales and the corresponding discounts in the last five-years period, and if the file 308 is derived from the file 302 by selecting the sales in the last six months, the later file can have significantly fewer rows and/or fields than the file 302. If the fields in smaller file generally match the fields in the larger file and if the field signatures match, it can be determined that the smaller file is a subset of the larger file. In comparing field signatures, fields with low cardinality (i.e., small number of values, e.g., gender), likely have very similar signatures. For example, all genders are likely present in both a file with 100 million records and a subset thereof with only 10 million records. Fields with high cardinality can be compared to determine if they represent a subsets of fields in larger file based on min, max, most common values, etc.

Referring back to FIG. 2B, in step 262 the formats of the files in the candidate pair (File_Aj, File_Bk) are compared to assign a format score to the pair. Substantially similar formats can indicate that File_Bk is a copy of File_Aj, though two unrelated files can also have the same format if one or both of those files are obtained via format conversion from other, unrelated files. Here again, format comparison can be just a starting point and that the actual determination of whether File_Bk was actually derived from File_Aj generally needs data/content analysis. A determination that two files have different format, however, does not necessarily imply that one file cannot be derived from the other. Two different files having different formats (e.g., a JSON file and an XML file) can be profiled separately and then the fields signatures can be compared.

It should be understood that in different implementations, one or more of the steps 252-262 can be skipped, i.e., a particular score associated with a step is not computed and not used in determining lineage. Also, in different implementations, some or all of the steps 252-262 can be performed in different orders. The scores computed in different steps can be aggregated, e.g., as a sum, average, weighted average, etc., to obtain a lineage score for the evaluated candidate pair in the step 206 (depicted in FIG. 1A).

In some implementations, after computing lineage scores and deriving lineage chains, a lineage graph is built. The roots and leaves of the graph are designated as non-temporary files. The filename can also be analyzed, e.g., to test if the name includes strings "temp" or "tmp" and/or the characters ",", "$," etc., to determine whether a file is temporary. Based on the sub-directories in which the root, leaf, and intermediate files are stored, those sub-directories can be designated as "landing," "work," or "production." In general, the files corresponding to the intermediary nodes or those stored in the "work" subdirectory are determined to be temporary unless one or more of the following conditions are satisfied.

An intermediate file that has more than a specified number (e.g., five, seven, ten, etc.) of direct descendants (i.e., files directly derived from the intermediate file) can be considered a non-temporary file. For example, with reference to FIG. 4, a file 402 is derived from the file 404, and each of files 406a, 406b, 406c is derived from the intermediate file 402. If the specified threshold is at least three descendants, the file 402 is not designated as a temporary file. If the threshold is four or greater, the intermediate file 402 is designated as a temporary file. If an intermediate file is used in a join operation (described above) with two or more files, that file can be designated as non-temporary. Additionally or in the alternative, if the descendants of an intermediate file are located in different sub-directories, that intermediate file can be designated as non-temporary.

In some implementations, the designation of files as temporary or the designation of a sub-directory as "work" can be used to optimize storage. For example, a user-specified storage policy can be applied to purge, archive, i.e., locate elsewhere, and/or compress the temporary files. The scope of the specified action can be limited to the files located in a specified sub-directory and/or files that have not been read for a certain specified time and/or updated for a specified time.

With reference to FIG. 5A, a timestamp based ordering of various files 502 at times t1 through t7 includes files 502a-502e. With reference to FIG. 5B, the candidate pairs 504 associated with the file 502d include a pair (502a, 502d) 504a, a pair (502b, 502d) 504b, and a pair (502c, 502d) 504c. The candidate pairs 506, depicted in FIG. 5C, are associated with the file 504b, and include the pair (502a, 502b) 506a. Similarly, as depicted in FIG. 5D, the candidate pairs 508 associated with the file 502e include a pair (502c, 502e) 508a and a pair (502d, 502e) 508b. Table 510, depicted in FIG. 5E lists the lineage scores, computed as described above, for each of these candidate pairs. Based on an analysis of these scores a lineage diagram 512 is generated as depicted in FIG. 5F. The lineage diagram indicates that the file 502d is derived from the files 502a, 502b. The lineage diagram 512 also shows that the file 502d is derived directly from the file 502b, which is derived directly from the file 502a. As seen in the lineage diagram, the file 502e is derived directly from the file 502c.

Format Discovery

Different sources, such as people and computers, can supply data to a data lake in many different formats. A format is a standard way that information is encoded for storage in an electronic file or data stream. The tabular or row-major format is a common format in which conventional tables including rows and fields are stored as values for all fields for the first row, followed by values for all fields for the second row and so on. Optionally, before storing the values, names of the fields can also be stored. Other common formats include fieldar, name-value, nested-structured, forms, and free text. In tabular files, there is typically a field delimiter, row delimiter, and the first row can optionally contain field names. For other formats, various representations exist including delimiters, separate structure definitions, or tags. For example, popular Parquet fieldar format stores data in row, field, value tuples organized by fields. XML or JSON files are self describing and contain tags that contain file names and brackets or delimiters to signify hierarchy. For files in irregular, but repeating format—such as log files, or for free-form text files, the user can provide regular expressions that can extract fields of interest.

These and other file formats generally describe one or more fields in a file. Any field typically has the following attributes: name, length (i.e., length of the data corresponding to that field), type (i.e., type of data associated with the field), empty (i.e., whether a file can be empty), description (which can be textual information about the field), tags (that can be used to categorize one or more fields and/or records, e.g., #customer, #PII, etc.), and identities (i.e., terms from common business glossary that has names and descriptions as well as industry ontologies, e.g., @customer_name; @financial_services.banking.clients.tax_id.US).

Data inventory's repository can retain all available information about the files such as name, description (as textual information), provenance (where did it come from), and tags (to categorize, e.g., #customer, #CRM, etc.). In various implementations, when a file is supplied to the data lake it is automatically profiled (e.g., by the inventory module 108 of FIG. 1A) and all the information about the file is uploaded to a the data inventory's repository which can be a local repository on a cluster. Only common information such as tag definitions, file format definitions, etc., is generally stored in a registry and is shared between users and companies. All information local to a company/cluster is often stored in a local repository. This can include all user specified metadata, a certain number (e.g., 200, 500, 1000, etc.) of most frequent values for each field and a certain number (e.g., 200, 500, 1000, etc.) of least frequent values for each field, and all possible formats for each field, as well as a minimum and maximum values for a field, number of unique values (also called cardinality), number of null (empty) values, number of non-null (not empty) values, and a measure of uniqueness of the field called selectivity defined as cardinality/number of non-null values. For numeric fields, one or more distributions of field values such as mean and first, second, and third-order standard deviations can also be uploaded to the common format repository. This information can be collected for fields in any type of file. For example, for tabular and columnar files, it is collected for each column. For files containing name-value pairs, it is calculated for each unique name and the statistics are computed across all the values for that name. For hierarchical files like XML and JSON, each unique XPATH (a '/' separate list of parent nodes for each node that contains values), is generally considered a unique field. Some implementations can provide a single repository for all data and/or metadata.

In one implementation, when a new file in an unknown format is submitted for discovery, the system analyzes the file to see if it matches any of the specified formats. To this end, the system first tries to apply a number of known formats (e.g., CSV, JSON, XML, etc.). If all of the applied, i.e., tested formats cause parsing errors, the system attempts to extract the file format. This is accomplished, at least in part, by identifying delimiters, i.e., frequently occurring unusual characters in the file, that can correspond to a format. To determine whether the file has a positional format, the system can test if certain characters are frequently found at the same positions, e.g., at the same line and field numbers. Thereafter, the system checks if the extracted file format matches any custom parsing formats already associated with the data platform (e.g., custom formats in HCatalog on the cluster) or are defined in a metadata repository. If a match is found, a custom parser corresponding to the matching format can be applied. If that parser causes parsing errors, however, the user can be prompted to manually define the file format.

In one implementation, once the format becomes known, whether discovered automatically or specified by the user, the system profiles the file and searches for matching patterns and values in the database of known formats and patterns. Based on, at least in part, any matches the system can propose all applicable tags and identities. For example, if the field contains values of format NNN-NN-NNNN it can match tags for #SSN, #TAXID.US etc. If a field has values such as John, Mary, Robert, Salil, the system can match tags #FirstName.

Figure 6A:
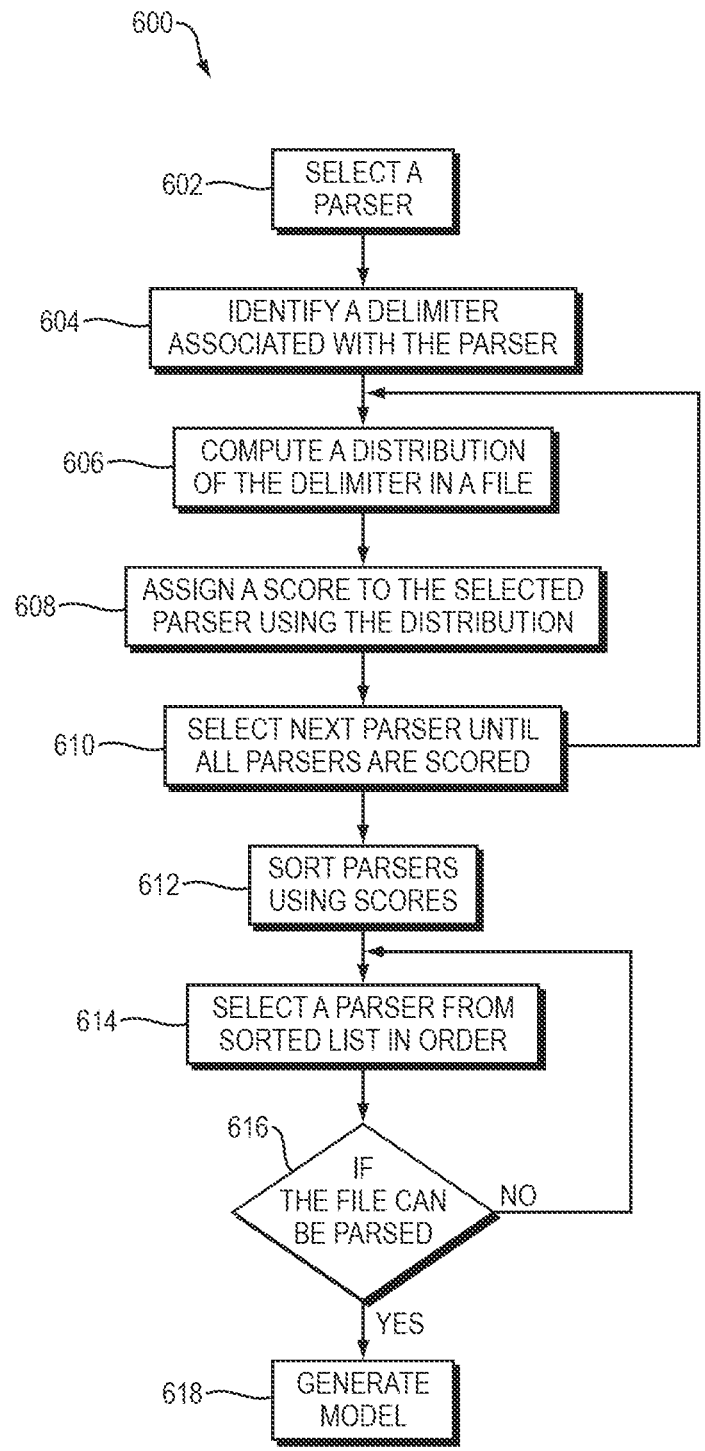
FIGS. 6A-6C depict examples of processes for format and/or schema discovery.

FIG. 6A depicts an example process 600 for format discovery. The operations described in FIG. 6A can be implemented by one or more data processing apparatus connected by one or more computer networks. The data processing apparatus can reside in the same or in different geographic locations. One or more candidate parsers are identified in step 602 (e.g., by the inventory module 108 of FIG. 1A). Each of these parsers can parse a specific file format (e.g., CSV, XML, custom format, etc.) and can retrieve data stored in that specific format. One or more of these parsers can also generate schema by parsing the file. Exemplary formats include JavaScript Object Notation, eXternal Markup Language, comma separated values, a tabular schema, or name value pairs.

In step 604, for each candidate parser, one or more delimiters are identified. The delimiters are special characters and typically have a high, i.e., frequent occurrence in files successfully parsed by the parser. The high occurrence can be an occurrence that exceeds a specified threshold such as percentage of characters in the file. In some implementations, one or more delimiters are non-alphanumeric characters.

In step 606, a file having an unknown format is analyzed to determine a distribution of each of the delimiters identified in the step 604. Thereafter, in step 608, for each candidate parser a score representing a likelihood that the parser will successfully parse the file having the unknown format is computed. The score computation is based on, at least in part, the delimiters of the candidate parser that were identified in the step 604, and percentage of occurrence of those delimiters that was computed in step 606 The score can also be based, at least in part, on the candidate parser's success rate. The success rate can be based on a number of files in a collection of files the parser successfully parsed in the past. The next candidate parser is selected in step 610, and the steps 604-610 are repeated until all candidate parsers are scored.

In one implementation, a high score indicates a greater likelihood that the parser to which the high score is designated can successfully parse the file having the unknown format. Therefore, in step 612, the candidate parsers are ordered according to the respective scores. In steps 614, 616, each candidate parser is then applied to the file having the unknown format, in order, until the file is successfully parsed.

In some implementations, in step 618 the format of the file is associated with the successful parser in a parser model. The successful parser is the parser that successfully parsed the file the format of which was initially unknown. If it is determined that another file has the same format, that other file can be parsed using the successful parser first as there is a high probability that the successful parser will correctly parse the other file as well. As such, a significant performance improvement can be achieved in parsing the other file because a number of candidate parsers that would have been tried otherwise are not applied and the previously successful parser is applied first.

In general, a candidate parser is determined to have parsed a file successfully if the candidate parser generated a correct schema for the file. All parsers are generally expected to conform to a standard API such as a popular Hive input format and serde. If the parser does not return errors and serde returns non-empty values for at least some columns, the parser is considered to have parsed the data successfully. If several different parsers can parse the same file, the parser that returns the most non-null values can be chosen. Additional checks can be performed to determine how well the parser schema matches the file such as comparing the size of parsed values (i.e., all the values that were returned as non-empty) to the size of the file. If only a small portion of the file was parsed successfully (e.g., <10, 20 or 30%), the file can be considered as not parsed. Alternatively or in addition, the determination of whether a candidate parser parsed a file successfully can depend on whether the parser generated schema element values that conform to a correct schema for the file parsed. The correct schema can have been identified by the parser itself, or can have been received from another source, such as from a human or from a repository.

In some implementations, a candidate parser can perform error correction. For example, if the parser expects a numerical value but reads non-numerical value, the parser can record a default value, such as a NULL value instead of the value actually read. In some implementations, a candidate parser is determined to have parsed a file successfully only if the number of parsing error corrections generated by that parser does not exceed specified threshold (e.g., 5 corrections per 100 lines, 8 corrections per 1000 tokens, etc.).

In some implementations, a user-specified regular expression is associated with the parser. The score for that parser is updated or determined based on, at least in part, whether a string matching the regular expression occurs in the file being parsed, which can be useful in parsing free form text files and log files. Some files can have fixed row widths, e.g., the first ten characters can be field 1, the next five characters can be field 2, etc. These files typically fill in any remaining spaces in a field with space characters, so at the end of a field such as name, space characters are frequently found because names can be of different lengths and many are shorter than the longest possible name. The parser can also detect repeating strings and formats. For example, if alphabetical characters are followed by a same size numeric string, the parser can determine that the numeric string corresponds to a separate field. Thus, the parser score can also be determined, at least in part, based on a signature, i.e., a string having several characters, that occurs frequently and in a same relative position in the files successfully parsed by the parser. As described before, in various implementations success require no parsing errors and that the parser returns non-null values. The frequency can be, for example, at least once, at least four times, ten times, etc., in every file, in at least half of the files, etc. In testing a file having an unknown format, the parser score can be determined, at least in part, based on the number of occurrences of the signature string in the relative position in the file.

Some parsers can be better suited than others to parse files having a positional format. As such, the various files each having a positional format, at least some of which are different, and that were successfully parsed by the parser are identified. If the number of the identified files exceeds a specified threshold (e.g., 50, 100, etc.), the parser score can be increased or a high score can be designated to the parser. Additionally or in the alternative, the parser score can be based on, at least in part, one or more positional format features of the file being tested, i.e., the unknown format file. Such positional format feature generally include an occurrence of a particular data type at a particular field in a number of rows in a file, an occurrence of a space separator at a particular field, or an occurrence of a constant value at a particular field.

Figure 6B:
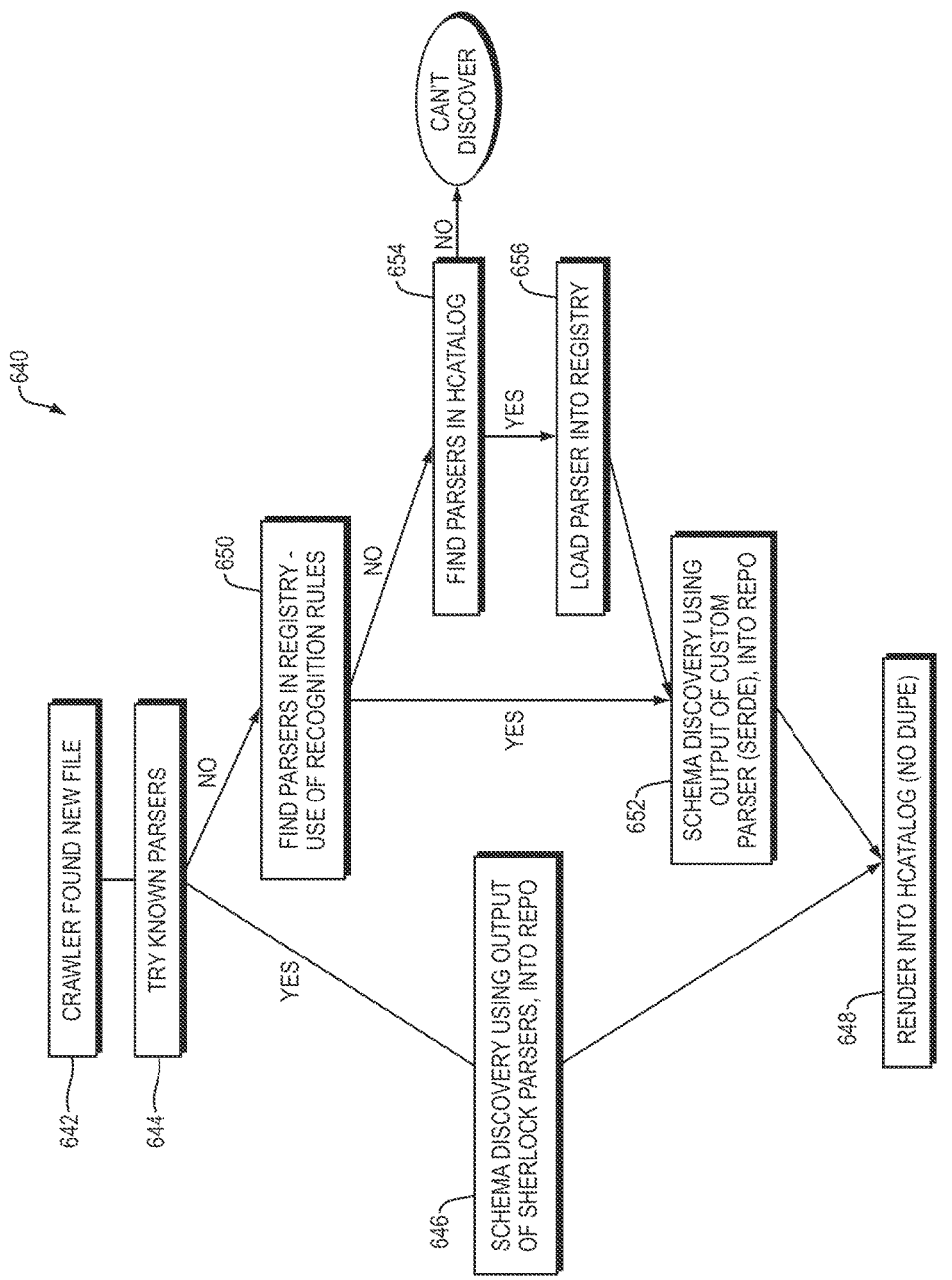

Process 640 depicted in FIG. 6B is an example of format and schema discovery. A new file can be discovered, e.g., in a cluster, in step 642. Parsing the new file using one or more parsers in a database of parsers known to have been successful in parsing previously read files in the cluster is attempted in step 644. If the file is parsed successfully, the corresponding schema is discovered in step 646, and is added to a repository. The schema can be added to a catalogue (e.g., Hcatalog), while avoiding duplicates, in step 648. If no parser was successful in step 644, candidate parsers are selected from a parser registry in step 650. One or more recognition rules can be used to select the candidate parsers. If a parser selected from the parser registry is successful, in step 652, the schema corresponding to the file can be discovered and can be added to a schema repository. The schema can also be added to a catalogue (e.g., Hcatalog) while avoiding duplicates, in step 648. If none of the parsers in the parser registry is successful, a catalogue (e.g., Hcatalogue) can be searched in step 654 to find a parser that can successfully parse the new file. If such a parser is found, that parser can be added into a parser registry in step 656, and steps 652, 648 can be repeated.

Figure 6C:
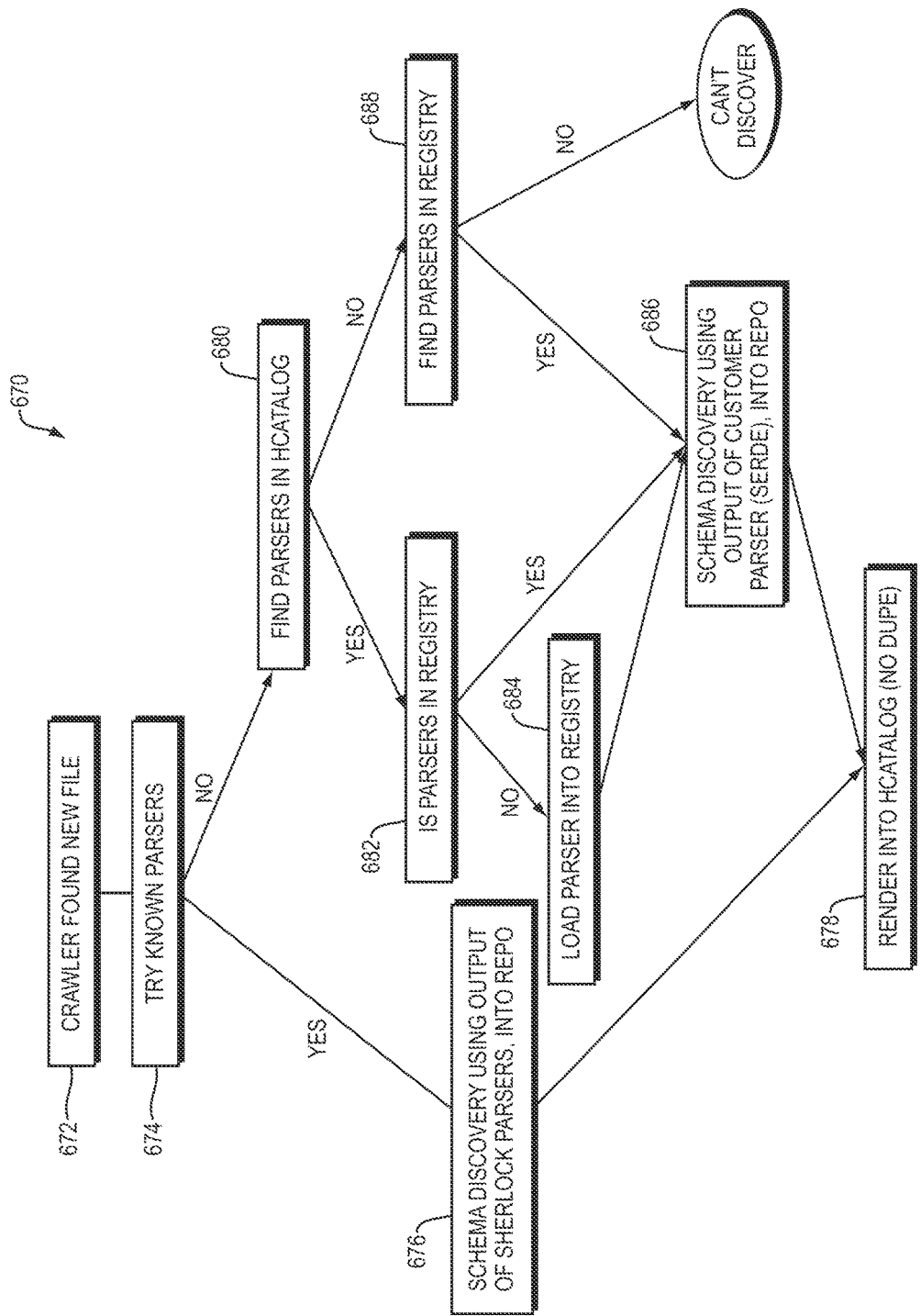

Process 670 depicted in FIG. 6C is another example of format and schema discovery. A new file can be discovered, e.g., in a cluster, in step 672. Parsing the new file using one or more parsers in a database of parsers known to have been successful in parsing previously read files in the cluster is attempted in step 674. If the file is parsed successfully, the corresponding schema is discovered in step 676, and is added to a repository. The schema can be added to a catalogue (e.g., Hcatalog), while avoiding duplicates, in step 678. If no parser was successful in step 674, a catalogue (e.g., Hcatalogue) can be searched in step 680 to find a parser that can successfully parse the new file. If such a parser is found, it is further determined in step 682 whether the parser is already included in a parser registry. If not, the parser is added to the registry in step 684. The schema corresponding to the file can be discovered in step 686, and can be added to a schema repository. The schema can also be added to a catalogue (e.g., Hcatalog) while avoiding duplicates, in step 678. If the parser was not found in a catalogue in step 680, a final attempt to file the parser in a parser registry can be made in step 688. If such a parser is found, the steps 686, 678 can be repeated.

Automatic Data Set Generation

In general in a data platform, data is stored, published, or accessed, e.g., via a query or subscription on an on-going basis. The data is usually contained in files that have formats and names. Ontologies can be associated with the data, and typically additional information about the data is derived from the metadata associated with the various data structures such as files, tables, etc., and properties of these structures.

The data contained in a file can be organized according to various dimensions. For example, the temporal dimension generally indicates a date/time at which a data element was recorded and/or updated, such as sales in a certain quarter, month, date, stock price at a certain time of the day, etc. Other exemplary dimensions include geographical data and person-related data. The dimension can be explicitly or implicitly defined by a user. Some of the fields in files are "dimensions" as in a star schema, i.e., the files include facts or transactions and dimensions or reference data. The semantic of a dimension field is that the field has the same meaning in each file, so these files can be related to each other.

Some dimensions have grains. For example, the temporal dimension can include coarse grains such as annual, quarterly, and monthly data, other grains such as weekly and daily data, and fine grains such as hourly data, data collected at each second, and even at a fraction of a second. Geographic data can also have coarse grains such as continents and sub-continents and regions of countries, and relatively fine grains such as a congressional district, a zip code, a street, etc. Depending on the actual value of a data element that is recorded and the corresponding dimension in which the data is to be stored and/or accessed, a grain conversion can occur. For example, a date associated with a data element can be converted into the corresponding month.

Data is often organized into one or more fields that have names and synonyms. "Cell phone" and "Mobile phone no." for example, are synonymous field names. Each field can have valid values and synonymous values. For example, the field gender can have valid values male and female, and corresponding synonymous values "M," and "F." Synonymous field names from different files can be translated so as to have a single field name for a certain type of data. Similarly, synonymous values from the same and/or different files can be translated so that identical data values can be identified. The translations can be based on a specified ontology. As described above, a dimension is a field that is present in many files and that can be used to relate the data in those files.

Various access methods can be associated with the data or data files. The access methods can be public (i.e., access is granted to public at large) or private (i.e., access is limited to authorized personnel). The access can be provided to the files themselves, and/or to the data, e.g., via structured query language (SQL) and/or not only SQL (NOSQL) database management system (DBMS), and representational state transfer (REST) application program interfaces (APIs).

When data is initially collected, it can include missing, incomplete, erroneous, or illegal values. While storing and/or during subsequent access, the data platform can substitute such values with corresponding default values and/or with values computed based on other valid values in the file. The substitutions can be made using specified rules or rules that the platform derives by analyzing previous translations/modifications. These translations are different than a translation from one synonym to another as described above.

In some implementations, a missing value of a field is left black, but in other implementations, the missing value is replaced with a mean of the other values corresponding to that field and/or a dimension. Alternatively, records or rows corresponding to the missing value can be removed. Illegal values, in general, can include values of a wrong type, an out of band/range value, a value not specified in a list of legal values, etc. In some implementations, an illegal value is replaced with null, default, or mean values, or the corresponding records/row are removed. Outliers can include values that are different than the mean by about N times the standard deviation. The multiple N can be 1, 2, 3, etc. In some implementations, the records/rows corresponding to an outlier is removed. In other implementations only the records/rows having at least one outlier value are extracted. In yet other implementations, the outliers are considered to be illegal values, and can be modified as described above. These values can be winsorized.

In some implementations, if an address is determined to be illegal (i.e., non-existing) that value is replaced with the closest legal address. Gender can be derived from first name and ethnicity can be derived from first and/or last name and place of birth. Data can also be anonymized in some implementations. For example, data can be made gender and ethnicity consistent by replacing real names with anonymous names that retain the gender and ethnicity. For example, a masculine Hispanic name like Jose, can be replaced with another masculine Hispanic name like Pablo. Geographic data can be anonymized to values within a specified range, e.g., within 5 miles, 10 miles, etc. Individual values can be randomized such that the total of the randomized values is substantially the same as the total of the original values. For example, all individual salaries in a department can be replaced with random salaries, while substantially maintaining the total salary for the department.

One or more of the above described transformation techniques can be applicable to the data in a file, based on one or more conditions associated with the data. In an automatic data generation process 700 depicted in FIG. 7A, previously applied transformations can be analyzed, a suitable transformation can be selected based on the analysis, and that transformation can applied to a data element. The operations described in FIG. 7A can be implemented by one or more data processing apparatus connected by one or more computer networks. The data processing apparatus can reside in the same or in different geographic locations.

In one example, a data scientist trained a predictive model to predict how much a house is going to sell for in Rochester, N.Y. She used a set of variables such as asking price, number of bedrooms, number of bathrooms, comparable prior sales, etc. If the number of bathroom was missing, she would put 1 for a 0-2 bedroom house and 2 for a house with more than 2 bedrooms. Now she wants to apply this model to sales in Princeton, N.J. She gathered the sales information, and now, to run the model, she needs to treat the data the same way it was treated when the model was created. For example, if the number of bathrooms is missing, she needs to set it to 1 for 0-2 bedroom homes and 2 for >2 bedroom homes or the model may not yield accurate results. The same transform (the setting missing number of bathrooms, in the example above), must be applied if the data scientist wants to apply the model to all the new homes for sale in Rochester, N.Y.

Figure 7A:
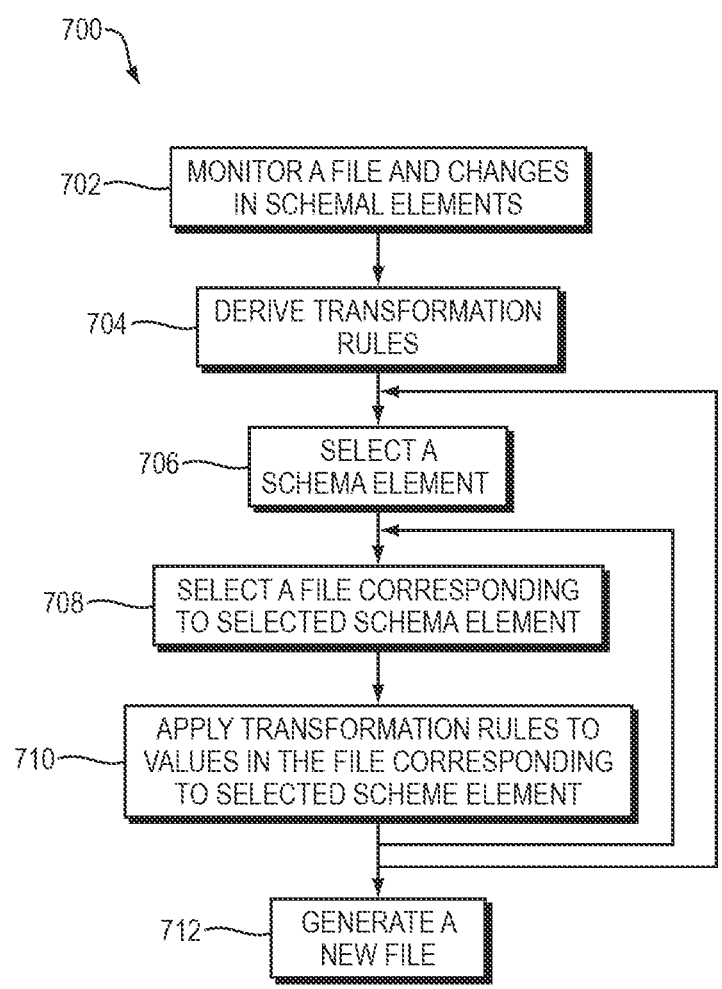
FIG. 7A depicts an example process for automatic data set generation.
Figure 7B:
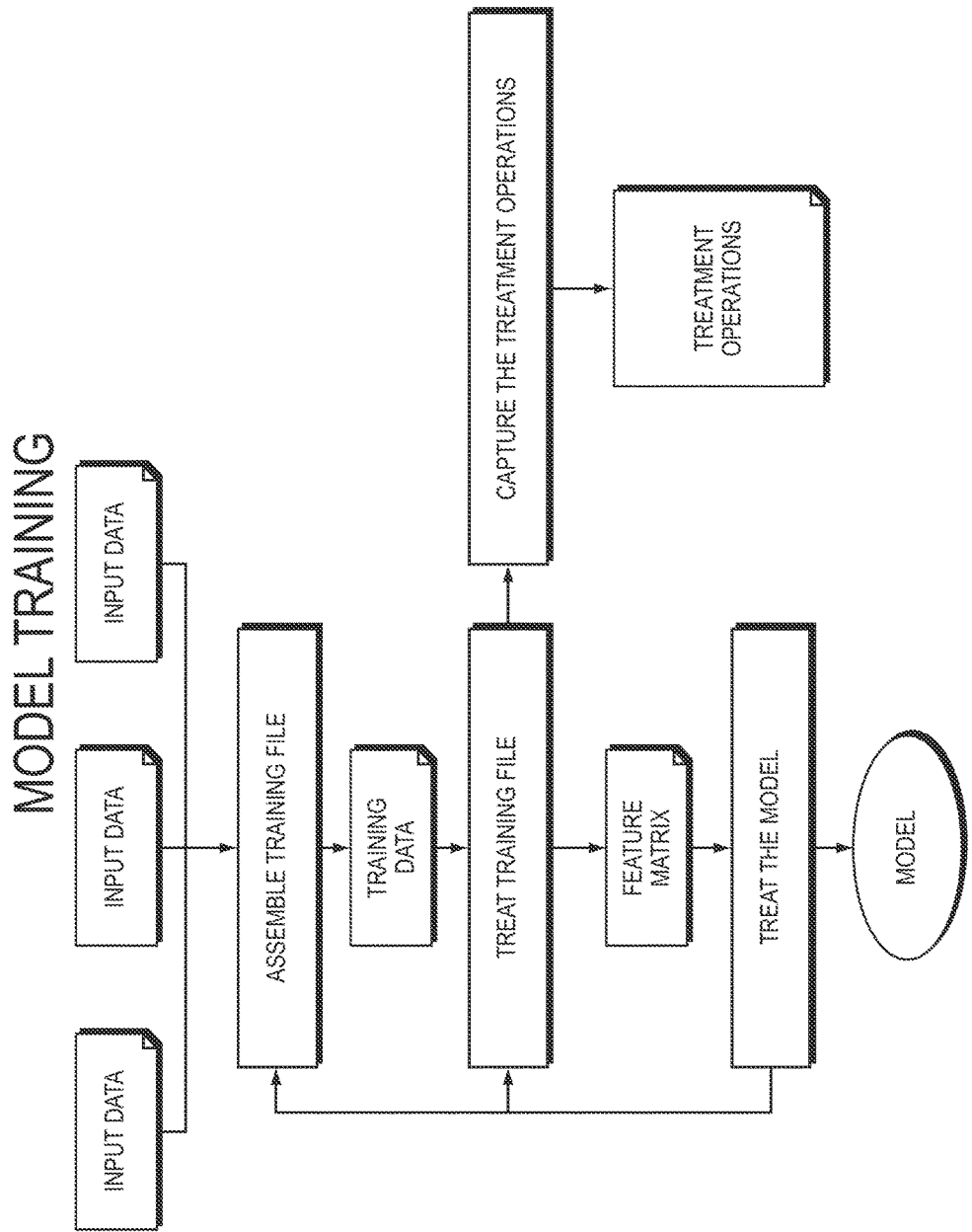
FIGS. 7B and 7C depict an example process for generating and applying data set transforms, according to an implementation.
Figure 7C:
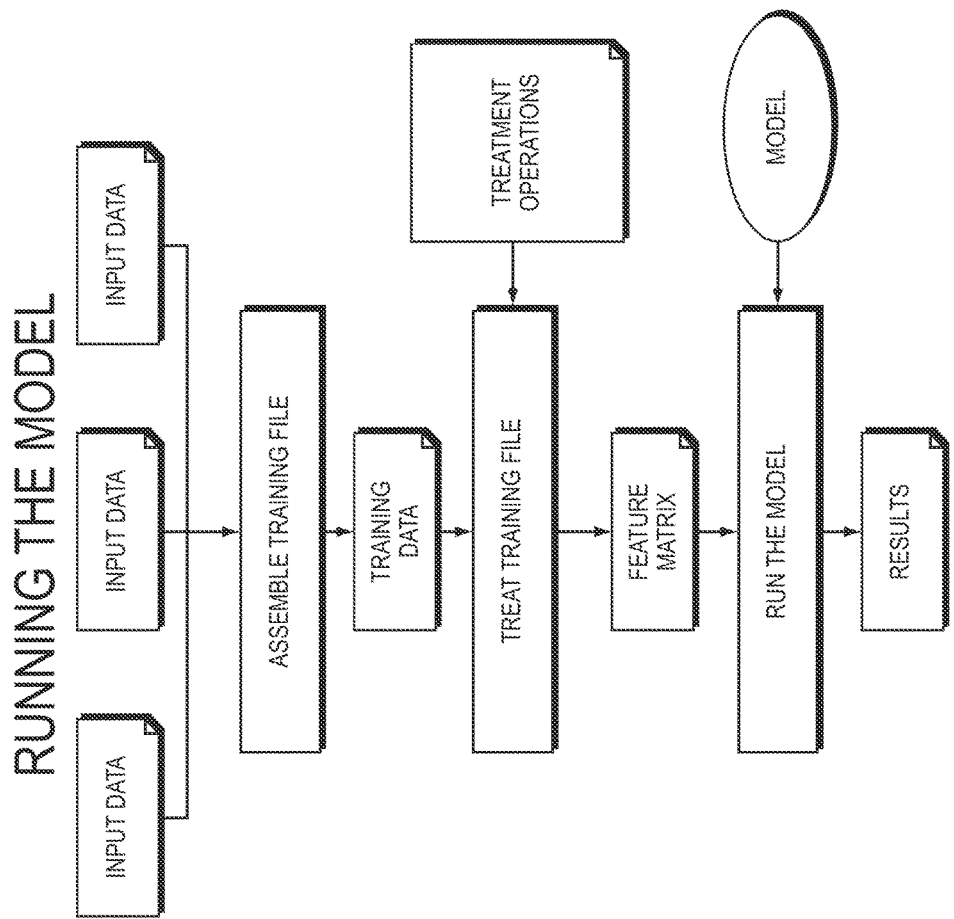
Figure 7D:
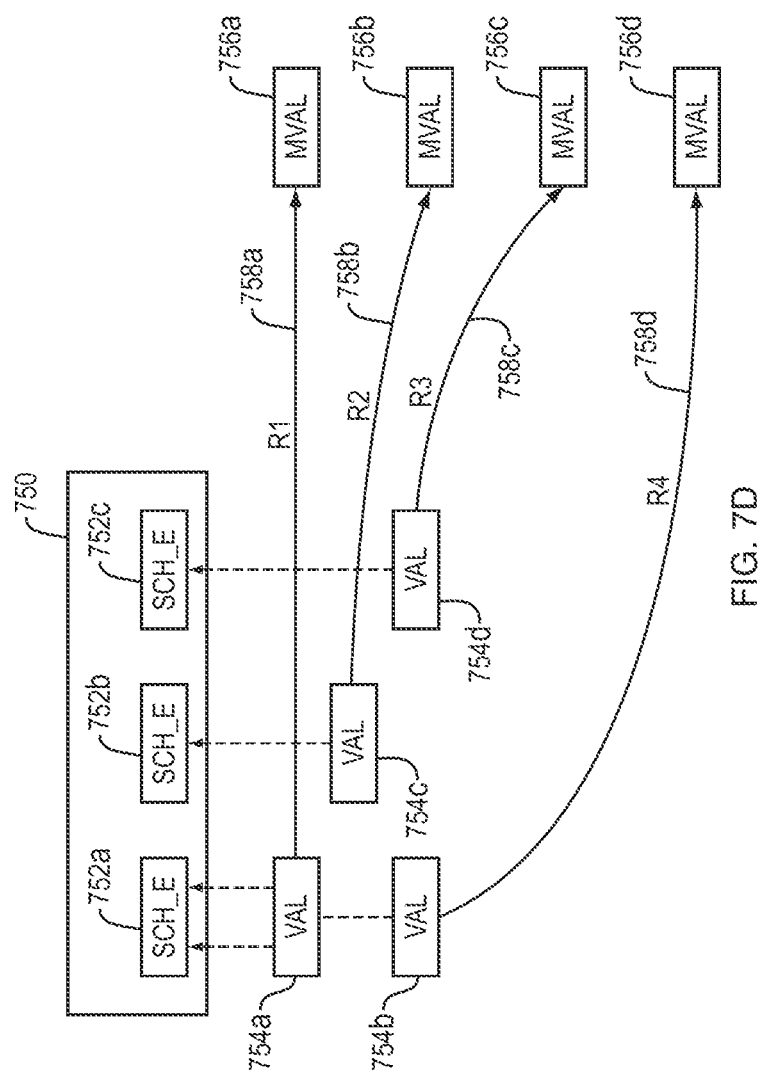
FIG. 7D schematically illustrates an data set generation example, according to an implementation.

With reference to FIGS. 7B and 7C, in general, a user can create a training file (TF) to train the model (M) and the set of transformations (TxSet) can be captured. When a new file (NF) is obtained, the same set of transformations (TxSet) is applied to the new file and then the model (M) is run on the transformed file to get results. Each of the files monitored in step 702 has a schema, such as schema 750 as depicted in FIG. 7D, and each schema includes one or more schema elements, e.g., schema elements 752a, 752b, 752c. Various types of values of a schema element, such as illegal values 754a, missing values 754b, outlier values 754c, and legal values 754d of the schema elements 752a-752c, can have changed over time into respective modified values 756a-756d. These changes/modifications are also observed in the step 702.

By observing the modifications, the underlying transformation rules are derived in step 704. Each transformation rule generally specifies, for a respective schema element, how a value of a certain type of that schema element is to be modified. For example, as described above, these modifications can include replacement with a NULL, mean, or closet legal value according to derived rules R1 758a, R2, 758b, and R3 758c. The modifications can also include randomization while preserving the total of the randomized values, according to a derived rule R4 758d.

In step 706, a schema element is selected for each of several model variables. For each selected schema element, a file containing values of the selected schema element is selected in step 708. In step 710, one or more values of the selected file are analyzed, and based on at least in part, the schema element, the type of the value, and the value itself, a suitable transformation rule is selected. For example, the rule R2 758b can be selected if missing values are replaced by the mean, and the rule R4 758d can be selected if legal values are randomized.

The steps 708, 710 can be repeated for additional or all files containing values of the schema element selected in the step 706. Thereafter, the steps 706-710 can be repeated for additional schema elements. In step 712 a new file is generated. The new file contains unmodified values from one or more files selected in step 708 and the modified values generated in the step 710, for each schema element.

It should be understood that implementations described with reference to FIGS. 7A and 7B are illustrative only and that the automatic data set generation process, in general, can analyze several schema, a number of schema elements (e.g., 50, 100, 200 elements), and can derive and apply several rules (e.g., 10, 40, 150 rules).

Map Reduce

MapReduce is a software programming model composed of parallel mapper processes that perform filtering and sorting of data and parallel reducer processes that perform summary operations on the output of the map processes. For example, many big-data storage and analysis systems store data using tuples, where each tuple includes a key and associated values. In order to reduce data storage costs, one or more reducers are used where each reducer is assigned several tuples for reduction. The reducer can achieve storage reduction, for example, by removing old values (e.g., older than one year, or any other specified period), values determined to be unnecessary for subsequent analysis, etc. As the data size increases, efficient utilization of reducers can be beneficial so that no one particular reducer is overburdened, while underutilizing other reducers.

Figure 8:
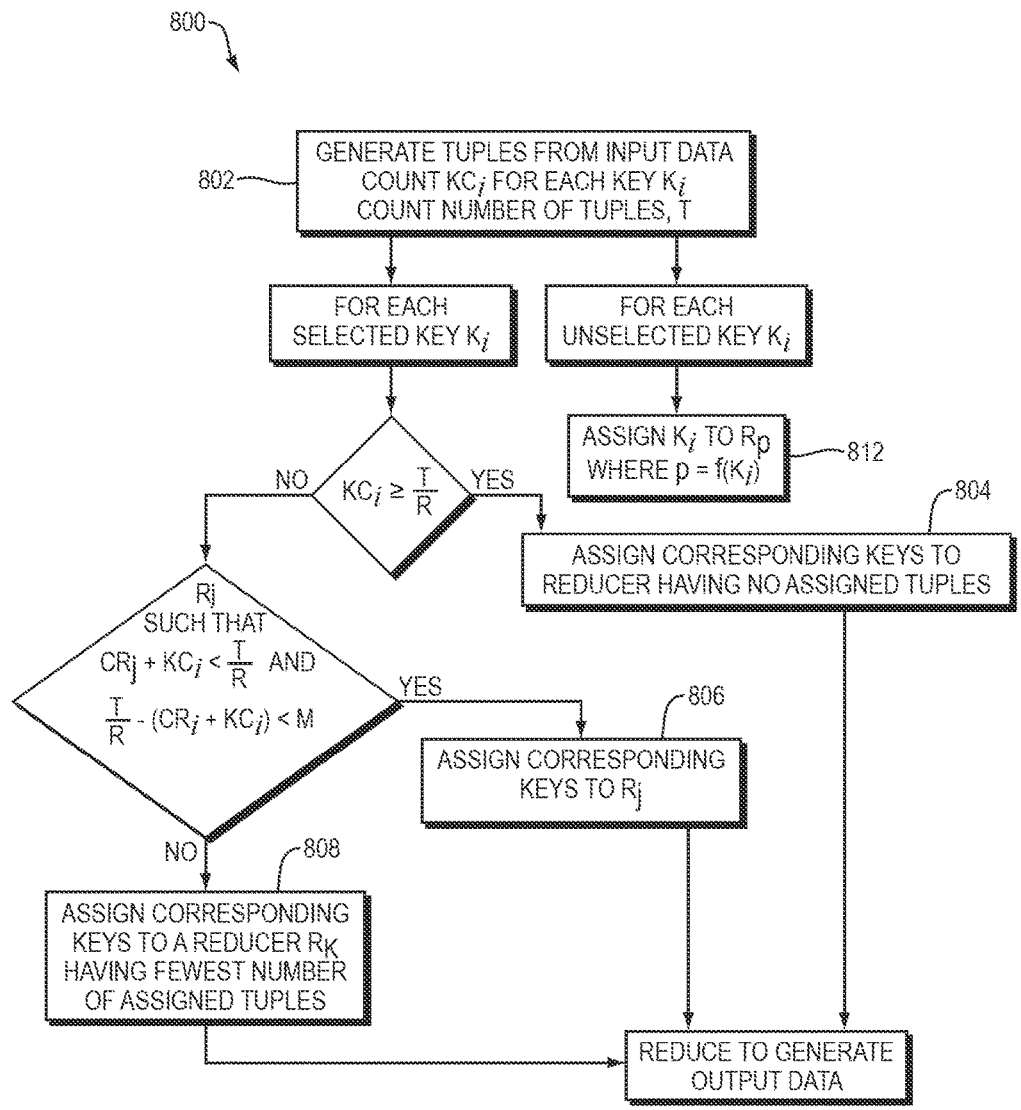
FIG. 8 depicts an example of a process of mapping reducers, according to an implementation.

To this end, with reference to FIG. 8, a number of mappers are configured to perform a map operation on respective input data to generate a number of respective tuples (step 802). Each tuple can have a respective key and one or more respective data values. $KC_i$ is a count of occurrences of a key $K_i$ in the tuples, T is a count of the tuples, and R is a count of the reducers. For each key $K_i$ from some or all of the keys, if $$KC_i \geq \frac{T}{R},$$

all tuples having $K_i$ as a key are assigned to one of several reducers that has no assigned tuples (step 804). Otherwise, if $$KC_i < \frac{T}{R},$$

all tuples having $K_i$ as a key are assigned to reducer $R_j$ of the several reducers (step 806). $R_j$ is selected such that $$CR_j + KC_i < \frac{T}{R} \text{ and } \frac{T}{R} - (CR_j + KC_i) < M,$$

where $CR_j$ is a count of tuples assigned to $R_j$ and M is a selected threshold (step 806). Otherwise, i.e., when $$KC_i < \frac{T}{R},$$

but no $R_j$ that satisfies the condition with threshold M was found, all tuples having $K_i$ as a key are assigned to a reducer $R_k$ having a fewest number of assigned tuples (step 808). Each reducer, having one or more tuples assigned thereto as described above, can perform a reduce operation on the tuples assigned to that reducer to generate output data (step 810).

In some implementations, prior to selection of a key $K_i$, the keys can be ordered according to KCi from highest KCi to lowest. In step 802, the key $K_i$ can be selected from only those keys that have the number of occurrences greater than a second threshold N and the other keys where KCi<N are distributed evenly among the remaining reducers. The threshold N can be specified as $$N = \left(\frac{T}{R}\right) \times c$$

where c is a specified constant. In some implementations, the first threshold M can be specified as $$M = \left(\frac{T}{R}\right) \times c$$

where c is the specified constant.

In the optional step 812, for each unselected key $K_i$, tuples having $K_i$ as a key can be assigned to a reducer $R_p$ where p is a function (e.g., a hash function) of $K_i$. The number of reducers R can be designated as $$R = \left\lceil \frac{T}{KC_x} \right\rceil,$$

wherein x is the reducer having the most tuples assigned thereto. The several mappers can operate simultaneously so as to perform the map operation in parallel. Similarly, the several reducers can also operate simultaneously so as to perform the reduce operation in parallel. Thus, several instances of steps 802, 810, and/or other steps can execute in parallel.

Contextual Metadata Navigation

Figure 9:
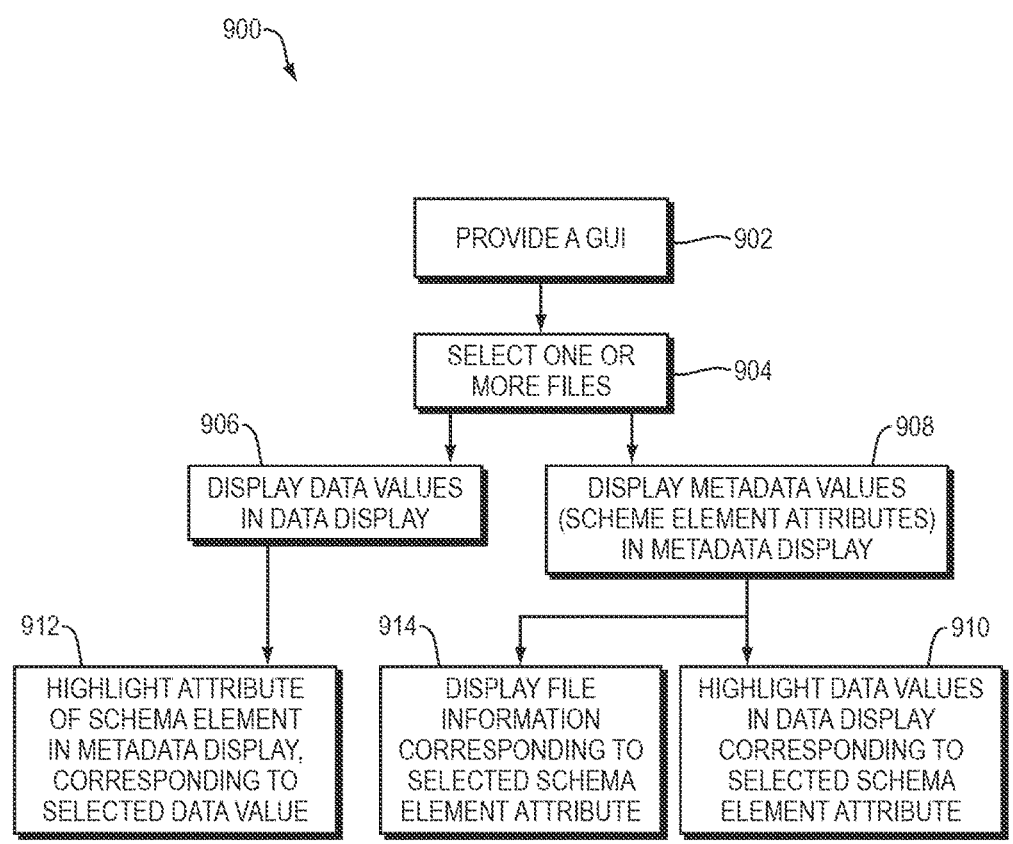
FIG. 9 depicts an example of a process for contextual metadata navigation, according an implementation.

Some implementations allow users to visualize a relationship between the values associated with a number of schema elements and one or more attributes of the schema elements. A particular schema element can be hierarchical, and can be a key, a name, an attribute, or a column. The values can be called data and schema-element attributes can be called metadata. To facilitate an interaction therebetween, with reference to FIG. 9, a graphical user interface is provided in step 902. The interface has an interactive metadata display and an interactive data display. A file having a schema that includes a number of schema elements is selected in step 904. The file can contain several values corresponding to the different schema elements. e.g., names, addresses, grade level, GPA, type of service provided to a customer, credit limit offered to a customer, etc. These values are presented on the data display, in step 906. In step 908, for one or more of the schema elements, respective metadata are presented on the metadata display.

The metadata can include one or more attributes that characterize values of the schema element, such as max, min, average, standard deviation, number of duplicates, number of values in certain ranges, etc. In general, an attribute of a particular schema element can include one or more of a label, a data type of a particular schema element, a minimum value and a maximum value of the values of the particular schema element, a distribution of values of the particular schema element, frequent values of the particular schema element, a frequency of values of the particular schema element, a frequency of lengths of values of the particular schema element, a frequency of patterns of values of the particular schema element, output of one or more hash functions applied to values of the particular schema element, or a regular expression for the values of the particular schema element.

In response to a user selecting one or more attributes of a particular schema element presented on the metadata display, the values in the file that are presented on the data display for that schema element and that have the selected attributes are highlighted in step 910. The highlighting can include changing color, background, and/or hiding the values of the file that do not have the selected attributes. Alternatively, or in addition, in response to a user selecting one or more values of another schema element presented on the data display, attributes of the other schema element displayed on the metadata display that characterize the selected values are highlighted in step 912.

In some implementations, a number of files can be selected in the step 904 and, correspondingly, data and metadata corresponding to different files can be presented in the steps 906, 908, respectively. In addition, a name corresponding to a respective schema can also be displayed in the metadata display. In an optional step 914, in response to receiving user selection of one of the schema names in the metadata display, information about one or more files that have the selected schema can be displayed. The displayed information can include names of the files, corresponding file directory locations, and respective lineages of the files. Optionally, in step 908, one or more schema elements of the schema that corresponds to the selected schema name can be displayed on the metadata display.

The metadata display and the interactive data display are presented on separate display devices, each of which can be a smart phone, a tablet computer, a laptop computer, smart glasses, or a smart watch.

Metadata (Glossary) Registry

In order to decipher a large amount of data, it is often necessary to know at least some aspects of the data, e.g., the meaning of at least some of the various data elements. It may be necessary to understand the meaning of data at the structural and/or field levels. Often, some people in the organization generating and/or using the data know the meaning of various data elements, and may record the meaning by annotating or tagging the data. These annotations can be an important source of metadata. Capturing this metadata and propagating it to the data, as applicable, can benefit all users of the data.

Some implementations allow annotations provided by data scientists and other users to be retained as part of the metadata content. These annotations can then be used to enable search, data understanding, and more fluent and accurate annotations. Generally, users tend to use the right terminology when creating annotations. While a stringent, consistent terminology usage can be enforced, such enforcement is often difficult if not improbable. The implementations of tagging and providing annotations that are described herein incorporate a technique that can capture as much as possible of the user-specified annotations and systematically progress towards increasingly higher levels of uniformity.

Specifically, as part of automatic and extensive analysis, capture, upkeep, and dispense annotations and notes that the data scientists and other users create as part of data search, browsing, and wrangling. To facilitate automatic, universal sharing of these annotations, use terms to annotate data in displays and browsing, and provide these content, i.e., annotations, as a vocabulary to encourage further annotations. This can lead to a glossary that is crowd-sourced and open-sourced: annotations entered by analysts can be automatically considered as a contribution to the common glossary. This way the glossary can be created bottom-up. Inconsistencies can be tolerated but can be resolved asynchronously, so such correctness does not stop the users from marching towards their goals. This technique is thus different from the "big bang" approach of creating common glossaries by standard definitions and standards committees such as HL7 for healthcare interchange. The content of a glossary created in a bottom-up manner is crowd sourced in a fashion that can capture and maximize the knowledge of the analysts without burdening them.

Once there is some content in the glossary, it can be leveraged to enable data scientists to produce more normalized, more precise tagging and annotation of data in the inventory with common terms, e.g., using terms that are common either inside or outside of enterprise. Tagging two different fields in two different files or databases with the same term can mean that these fields represent the same item and that their data has the same domain and units of measure. This processing and analysis based on such tagging can provide for a functional, if not completely coherent glossary and allow the big data lake to stay clear and more coherent.

In one implementation such a glossary can be hosted with a multi-tenant cloud application. There can be many installations of a data analysis system, but all users thereof can have access to the glossary cloud, where the content is managed and shared across all tenants. The crowd-sourced implementation can permit committers to generate the content and editors or stewards to review and approve the submissions, i.e., the generated content. Industry specific ontologies can be created through crowdsourcing to organize various terms into coherent groupings and to divide the name space, because the same terms may have very different meaning in different industries or for different subjects within the same industry. Some implementations include both private and public glossaries. Users can use the shared (public) glossary by default but can opt out to a private glossary. The system can facilitate reconciliation between public and private registries. For example, if a public term X is called Y at a particular enterprise, Y can be a local synonym of X and the data inventory with respect to that particular enterprise can automatically translate X to Y and vice versa when moving data between providers that are internal to the particular enterprise and external data providers.

A glossary with rich, crowded sourced content can be a valuable asset that can be leveraged for other purposes. In some implementations, the glossary with data signatures is extended in support of schema discovery. Specifically, the terms, definitions, as well a set of data signatures of the columns that are classified by each particular term can be preserved in the glossary. The system thus has acquired knowledge of the name (the term) of a set of items, and it can also memorize a number of instances of these items, max, min, frequent values, distributions, regex, etc. Subsequently, if the system receives or locates a file (e.g., a csv file) with no column headers, the system can use the knowledge acquired via previous analysis and stored in the glossary to attempt to give each column a header. For example, the system can determine that some of these columns are names of companies, their addresses, etc.

To this end, the data signatures of one or more columns, e.g., type, length, patterns, and/or combination thereof, etc. are computed. The data signature of a term can be a collection of column signatures of columns designated or determined to be classified by that term. A particular column profile, of a column that does not have a label, can then be matched with term data signatures to provide a ranked list of possible matching terms, with computed confidence levels. One of these terms determined to be the best match can then be designated as a label to that particular column.

Figure 10:
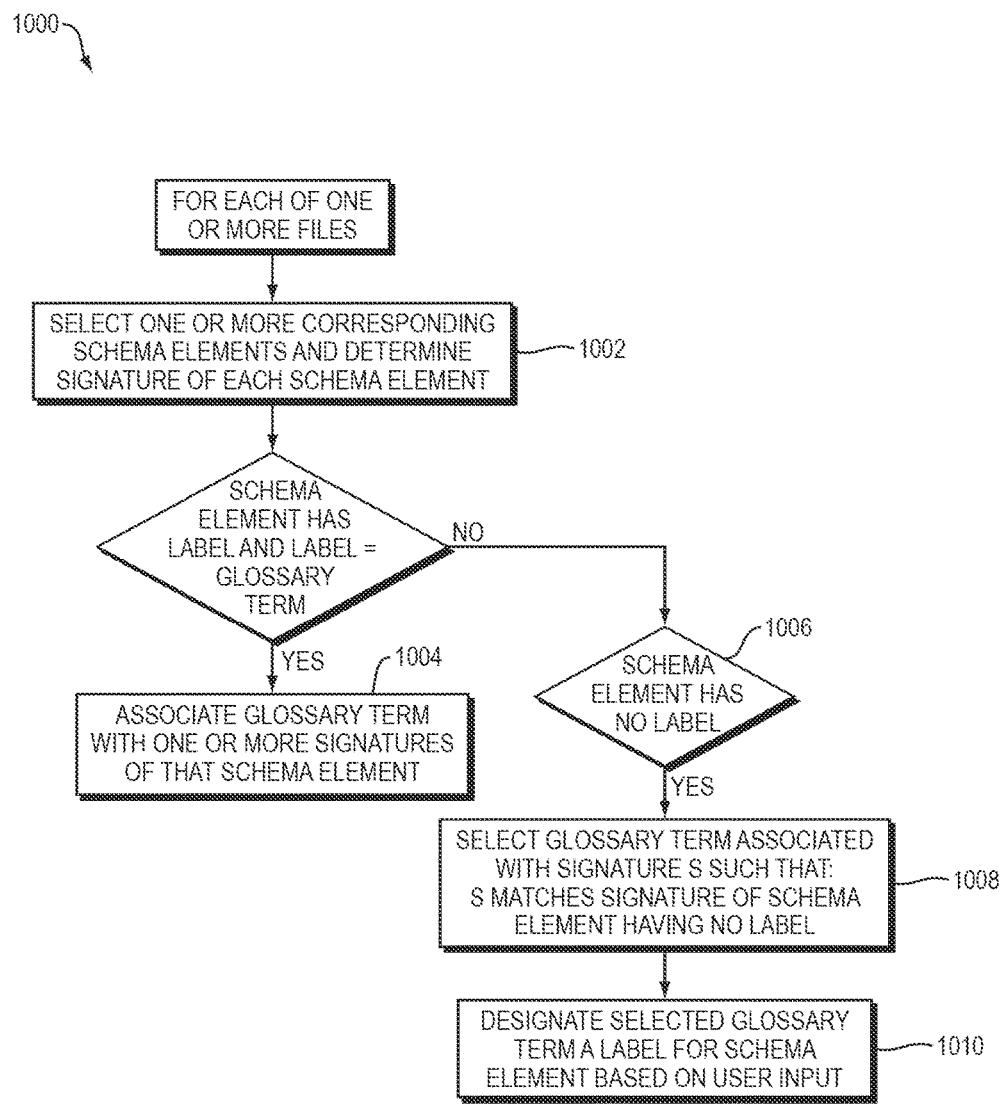
FIG. 10 depicts an example of a process for generating and using a glossary registry, according to an implementation.

Specifically, with reference to FIG. 10, for each one of a number of files, one or more respective schema elements in the file are selected, and a respective signature for the selected schema element is determined (step 1002). The signature is a characterization of several values of the schema element in the selected file. For each one of several glossary terms, the glossary term is associated with the signatures of one or more of the schema elements if each of those elements has a schema element label that matches the glossary term (step 1004). The matching in step 1004 can include calculating an edit distance between the label and the glossary term, and determining that the label matches the glossary term based on the edit distance not exceeding a specified threshold. A label can also be determined to match a glossary term if the label is a synonym of the glossary term. To facilitate this match, synonyms of one or more glossary terms can be specified by a user.

A first schema element of one of the several files is identified such that the schema element does not have a schema element label (step 1006). A glossary term associated with a signature that matches a signature of a schema element that does not have a label is selected as a suggested schema element label for that schema element (step 1008). A match between the two signatures can be based on respective types of the schema element data values, frequency of the types, range of the data values, distribution of the data values, format of the data values, length of the data values, overlap in the data values, and overlap in most common data values.

In some implementations, selecting a glossary term as a suggested schema element label for a particular schema element can include identifying several glossary terms that are associated with respective signatures that match the signature of that particular schema element, and selecting one of those glossary terms based on one or more criteria such as, e.g., a count of times that the glossary term is used as a schema element label in the various files.

In some implementations, in an optional step 1010, the selected glossary term is provided as a suggested label for a particular schema element lacking a label, and user input accepting or rejecting the suggested label is received. One or more glossary terms can occurs as a schema element label in a number of different files associated with a number of different users.

A particular schema element can be an eXtensible Markup Language (XML) fragment, a JavaScript Object Notation (JSON) structure, a Graph DB graph, a portion of a relational, columnar, in-memory or non-relational database, an object store schema element, or a log file. A particular schema element can be hierarchical, or a key, a name, an attribute, or a column. A particular schema element can also be a column field and the signature of the particular schema element can include one or more of the following: a data type of a particular schema element, a minimum value and a maximum value of the values of the particular schema element, a distribution of values of the particular schema element, frequent values of the particular schema element, a frequency of values of the particular schema element, a frequency of lengths of values of the particular schema element, a frequency of patterns of values of the particular schema element, output of one or more hash functions applied to values of the particular schema element, and a regular expression for the values of the particular schema element.

The profiling technique described herein is applicable to both relational schema (e.g., schema associated with a file having row-column format where each column can represent a schema element) and non-relational schema (e.g., schema associated with XML, JSON, Graph DB, big table, etc.). In the case of non-relational schema, the signatures of schema elements can include various attributes instead of or in addition to the common attributes (e.g., minimum and maximum values, variance, etc.) of the schema elements in a relational schema. A particular schema element can be an XML fragment or a JSON structure, and the signature of that particular schema element can include one or more of the following: elements, attributes, Uniform Reference Locators, XPATH, dependencies between element values and presence of other elements, average element depth, minimum element depth, maximum element depth, element frequency, bad elements, constant elements, implied nulls, profile of element values, and references to other files.

A particular schema can be element a GraphDB graph, and the signature of that particular schema element can include one or more of the following: average graph depth, disconnected nodes in the graph, most connected nodes in the graph, a count of islands in the graph, sizes of islands in the graph, sizes of the biggest and smallest islands in the graph, an average size of an island in the graph, and counts of nodes having different respective numbers of connections.

A particular schema element can be a portion of a name-value or big table database, and the signature of the particular schema element can be based on one or more of the following attributes the schema element data values: cardinality, nulls, functional dependencies between column values and between presence of various columns, least frequent columns, empty columns, constant columns, column groups, minimum, average and maximum number of columns having values, number of columns, and key columns for each column group.

In some implementations, a particular schema element can be a name-value or big table database column that includes one or more of comma separated values, a JSON object, or an XML document. A particular schema element can also be a log file, and the signature of the particular schema element can include one or more of tags, most frequent messages, minimum, average and maximum time between messages, and common fields.

FIG. 11A depicts an example of a profile of columns of data represented in columnar format. Various attributes such as type, length, classification, max, min, mode, median, uniqueness, null (indicating whether a row includes at least one null value, at least a specified number of null values, etc.), non-null uniqueness, cardinality, frequency of values (e.g., a histogram), and pattern frequency. It should be understood that the attributed listed above are examples only and that different implementations can include fewer, more, and/or different attributes. For one or more attributes, the corresponding values, as shown in FIG. 11A, can also be identified.

FIG. 11B depicts an example of a profile of non-tabular (e.g., NoSQL) data. While some attributes are the same as that shown in FIG. 11A, the schema elements in non-tabular data can be hierarchical. For example, an order can have attributes such as an order ID, a shipping address, and a list of ordered items. A shipping address, can include attributes such as a street address, a state, and a zipcode, and an ordered item can have attributes such as an item name, price, etc. As such, the profile of the data depicted in FIG. 11B can include an attribute depth. Also, the values of the attributes of a particular schema element, e.g., orders, can represent values of the attributes of the associated sub-schema. One or more attributes of orders, for example, can be derived from one or more attributes of items, which is a sub-schema element of the schema element orders. In some implementations, the schema elements, the corresponding sub schema elements, the attributes of one or more sub schema elements, and attributes of schema elements that are based on the attributes of the corresponding sub schema elements are computed.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   monitoring a plurality of files over time for changes to content of the files, each file having a respective schema and wherein the changes are to values of respective schema elements;
   deriving one or more transformation rules based on the monitored changes, wherein each transformation rule specifies, for a respective schema element, a treatment of a respective value of the schema element;
   selecting a respective schema element for each of a plurality of model variables;
   identifying, for each selected schema element, a respective file containing initial values of the selected schema element;
   for one or more initial values stored in the respective files, each initial value being at least one of: missing, incomplete, erroneous, and illegal, substituting the initial value with a corresponding substitute value using the transformation rule for the respective schema element that matches the schema element of the initial value; and
   generating a first file from the identified files wherein the first file contains at least one transformed value for one or more of the selected schema elements,
   wherein substituting the initial value using a transformation rule for the respective schema element that matches the schema element of the initial value is selected from the group consisting of i) replacing the initial value with a value having a coarser grain, replacing the initial value with a default value, or replacing the initial value with an anonymous equivalent value, ii) determining that the initial value is empty and, based thereon, deleting a row from the file that contains the initial value, (iii) determining that the initial value is an outlier and, based thereon, deleting a row from a file that contains the initial value or replacing the initial value with a value that is not an outlier, and (iv) determining that the initial value is an outlier and, based thereon, deleting a row from a file that contains the initial value or replacing the initial value with a value that is not an outlier.

2. The method of claim 1 wherein the initial value represents gender, ethnicity, or geographic location.

3. The method of claim 1, wherein generating a first file from the identified files comprises:
changing a respective name of one of the first schema elements to a different name.

4. The method of claim 3 wherein the different name is a synonym of the respective name or a corresponding name.

5. The method of claim 1 wherein a particular schema element is part of a hierarchy of schema elements, is a key, is an element, is a name, is an attribute, or is a column.

6. The method of claim 1 wherein generating a first file from the identified files comprises:
generating a new variable based on a plurality of the variables; and
selecting a respective schema element for the new variable.

7. The method of claim 1 wherein identifying, for each selected schema element, the respective file containing values of the selected schema element comprises:
identifying a file from a plurality of files having values for the largest number of selected schema elements.

8. The method of claim 1 wherein a plurality of the identified files are joined through one or more common keys.

9. The method of claim 8, wherein the common keys are identified using tags from a metadata registry.

10. The method of claim 1 wherein one or more respective dimension grains of a plurality of the identified files match.

11. The method of claim 1 wherein generating the first file from the identified files comprises aggregating respective grains of one or more dimensions in the identified files to a finer grain.

12. The method of claim 1 wherein generating the first file from the identified files comprises applying a filter to content in one or more of the identified files so that only rows that match the filter are retained in the first file.

13. A computer-implemented method comprising:
providing a graphical user interface having an interactive metadata display and an interactive data display;
in response to a user selecting a first file having a schema comprising a plurality of schema elements and wherein the first file contains a respective plurality of data values for each of the schema elements and at least one attribute of a first schema element in the plurality of schema elements is missing, ambiguous, or misleading;
deducing an attribute of the first schema element according to one or more of: (i) an attribute of a corresponding schema element in a second file in a lineage of the first file, (ii) a tag associated with the first schema element in a metadata repository, and (iii) an attribute of a matching schema element in a third file, wherein the schema element in the third file is determined to be matching when a signature of data values associated with the first schema element is same as a signature of data values associated with the potentially matching schema element, the signature comprising one or more of: type of the data values, range of the data values, distribution of the data values, format of the data values, length of the data values, overlap in the data values, and overlap in most common data values;
presenting on the data display a plurality of the data values in the first file;
presenting on the metadata display, for each of the plurality of schema elements, respective metadata that comprises a plurality of attributes that characterize respective data values associated with the schema element, the metadata comprising the deduced attribute of the first schema element; and
receiving user selection of one or more of the data values of the first schema element presented on the data display and, based thereon, highlighting attributes of the first schema element on the metadata display that characterize the selected data values.

14. The method of claim 13, further comprising:
presenting on the metadata display a plurality of schema names each corresponding to a respective schema having one or more respective schema elements; and
receiving user selection of one of the schema names in the metadata display and, based thereon, presenting on the data display information about one or more files that have the selected schema.

15. The method of claim 14, wherein the information comprises one or more of: respective names and respective file directory locations of the files, and respective lineages of the files.

16. The method of claim 14, further comprising presenting on the metadata display one or more schema elements of the schema that corresponds to the selected schema name.

17. The method of claim 13, wherein the metadata display and the interactive data display are presented on separate display devices.

18. The method of claim 17, wherein one of the display devices is a display on a smart phone, a tablet computer, a laptop computer, smart glasses, or a smart watch.

19. The method of claim 13, wherein highlighting the data values of the file presented on the data display that have the selected attributes of the first schema element comprises hiding the data values of the file that do not have the selected attributes.

20. The method of claim 13, wherein a particular schema element is hierarchical, a key, a name, an attribute, or a column.

21. The method of claim 13, wherein an attribute of a particular schema element comprises: a label, a data type of a particular schema element, a minimum value and a maximum value of the values of the particular schema element, a distribution of values of the particular schema element, frequent values of the particular schema element, a frequency of values of the particular schema element, a frequency of lengths of values of the particular schema element, a frequency of patterns of values of the particular schema element, output of one or more hash functions applied to values of the particular schema element, or a regular expression for the values of the particular schema element.

22. The method of claim 13, further comprising:
receiving user selection of one or more of the attributes of a second schema element presented on the metadata display and, based thereon, highlighting the data values in the file presented on the data display for the second schema element and that have the selected attributes of the second schema element.

* * * * *